(12) United States Patent
Wood et al.

(10) Patent No.: US 8,505,169 B2
(45) Date of Patent: Aug. 13, 2013

(54) HINGE ASSEMBLY

(76) Inventors: Wesley Wood, Ball Ground, GA (US); Matthew Wood, Jasper, GA (US)

( * ) Notice: Subject to any disclaimer, the term of this patent is extended or adjusted under 35 U.S.C. 154(b) by 197 days.

(21) Appl. No.: 12/795,783

(22) Filed: Jun. 8, 2010

(65) Prior Publication Data
US 2011/0296761 A1  Dec. 8, 2011

(51) Int. Cl.
*E05D 5/02* (2006.01)
(52) U.S. Cl.
USPC .............. 16/387; 16/223; 16/374; 16/85
(58) Field of Classification Search
USPC ............... 16/387, 388, 382, 223; 439/31, 439/165; 200/61.7, 61.71, 61.78, 61.81, 200/61.82; 174/36, 86, 68.3, 68.1, 65 R, 174/100, 151, 152 G, 153 G, 65 G
See application file for complete search history.

(56) References Cited

U.S. PATENT DOCUMENTS

| | | | | |
|---|---|---|---|---|
| 1,536,391 A | * | 5/1925 | Eastman | 16/85 |
| 1,714,950 A | * | 5/1929 | Earhart | 16/85 |
| 2,056,805 A | * | 10/1936 | Reichard | 16/355 |
| 2,065,700 A | * | 12/1936 | Horst | 16/363 |
| 2,688,733 A | | 6/1952 | Walter, Jr. | |
| 2,778,000 A | | 6/1952 | Mills | |
| 2,700,139 A | | 1/1955 | Jewell | |
| 2,817,871 A | | 7/1955 | Ferry | |
| 3,076,163 A | | 1/1963 | Nodge et al. | |
| 3,838,234 A | | 9/1974 | Peterson | |
| 3,842,386 A | | 10/1974 | Suska | |
| 3,857,625 A | | 12/1974 | Crane et al. | |
| 4,116,514 A | | 9/1978 | Lawrence | |
| 4,140,357 A | | 2/1979 | Wolz et al. | |
| 4,168,409 A | | 9/1979 | McNinch | |
| 4,284,861 A | * | 8/1981 | Senften | 200/61.7 |
| 4,412,711 A | | 11/1983 | Suska | |
| 4,445,299 A | * | 5/1984 | Lehikoinen et al. | 49/167 |
| 4,543,800 A | | 10/1985 | Mawby et al. | |
| 4,839,939 A | | 6/1989 | O'Brien, II | |
| 5,586,895 A | | 12/1996 | Zehrung | |
| 5,690,501 A | * | 11/1997 | Mader | 439/165 |

(Continued)

FOREIGN PATENT DOCUMENTS

EP    1489255 A1 * 12/2004
FR    2337446 A  *  9/1977

*Primary Examiner* — Chuck Y. Mah
(74) *Attorney, Agent, or Firm* — Crose Law LLC; Bradley D. Crose

(57) ABSTRACT

A hinge is provided. In at least one embodiment, the hinge includes: a first hinge leaf; a second hinge leaf interleaved with the first hinge leaf; a housing defined within a posterior side of at least one of the first hinge leaf and the second hinge leaf and configured to receive a conduit adapted to receive and pass through a medium of power transfer from the first hinge leaf to the second hinge leaf on an anterior side of the first hinge leaf and second hinge leaf; and an aperture defined on the anterior side of at least one of the first hinge leaf and the second hinge leaf through which to access the housing. In various embodiments the hinge can include multiple housings, fittings, turrets, and ball-and-socket fittings. In various embodiments, conduits are flexible, rigid, both flexible and rigid, elastic, braided, and telescoping.

8 Claims, 40 Drawing Sheets

(56) References Cited

U.S. PATENT DOCUMENTS

| | | |
|---|---|---|
| 5,717,380 A | 2/1998 | Zehrung |
| 5,727,960 A | 3/1998 | Zehrung |
| 6,099,117 A | 8/2000 | Gregory |
| 6,372,986 B1 * | 4/2002 | Saeki et al. ............ 174/651 |
| 6,725,504 B1 | 4/2004 | Dickson et al. |
| 6,812,407 B1 * | 11/2004 | Opperman ............ 174/100 |
| 7,137,173 B2 | 11/2006 | Sipple |
| 7,943,854 B1 * | 5/2011 | Lipp ............ 174/152 G |
| 2002/0112320 A1 * | 8/2002 | Hayashi ............ 16/386 |
| 2006/0017361 A1 | 1/2006 | Rendel et al. |

* cited by examiner

HINGE ASSEMBLY

FIELD OF THE INVENTION

The technology described herein relates generally to hinges and door wire routing systems. More specifically, this technology relates to a hinge assembly with which to hang a door and through which to route a wire, or the like, in a concealed, protected manner.

BACKGROUND OF THE INVENTION

Door hinges, door routing systems, power transfer hinges, and electrical hinges are known in the art. By way of example, known devices can include passing wires through or around a hinge pin within one or more hinge knuckles, utilizing a space created within a common bore created by interleaved knuckles, utilizing recesses in hinge leaves, utilizing passageways bored in hinge leaves, and utilizing routing systems that are not themselves hinges and from which a door cannot be hung. There are many limitations and deficiencies with these known devices.

Related patents and published patent applications known in the art include the following: U.S. Pat. No. 4,412,711, issued to Suska on Nov. 1, 1983, discloses a two knuckle electrical hinge. U.S. Pat. No. 4,140,357, issued to Wolz et al. on Feb. 20, 1979, discloses an electric hinge. U.S. Pat. No. 6,099,117, issued to Gregory on Aug. 8, 2000, discloses a hinge with wire extending therethrough. U.S. Pat. No. 5,586,895, issued to Zehrung on Dec. 24, 1996, discloses a power transfer hinge. U.S. Pat. No. 5,690,501, issued to Mader on Nov. 25, 1997, discloses an electrical power transfer for three quarter inch offset pivots. U.S. Pat. No. 2,688,733, issued to Walter, Jr. on Sep. 7, 1954, discloses an electric current carrying hinge with spring. U.S. Pat. No. 2,700,139, issued to Jewell on Jan. 18, 1955, discloses a concealed type hinge. U.S. Pat. No. 3,838,234, issued to Peterson on Sep. 24, 1974, discloses a hinge through which an electrical circuit is completed with means to interrupt the circuit. U.S. Pat. No. 2,778,000, issued to Mills on Jan. 15, 1957, discloses a conductive hinge for a refrigerator door. U.S. Pat. No. 2,817,871, issued to Ferry on Dec. 31, 1957, discloses a hinge. U.S. Pat. No. 3,076,163, issued to Nodge et al. on Jan. 29, 1963, discloses a hinge pin with an electrical connector. U.S. Pat. No. 3,842,386, issued to Suska on Oct. 15, 1974, discloses a hinge for passing electrical current. U.S. Pat. No. 3,857,625, issued to Crane et al. on Dec. 31, 1974, discloses an electrical connector hinge. U.S. Pat. No. 4,116,514, issued to Lawrence on Sep. 26, 1978, discloses a security hinge. U.S. Pat. No. 7,137,173, issued to Sipple on Nov. 21, 2006, discloses a device for leading and holding electrical lines in a swivel region of doors. U.S. Pat. No. 6,812,407, issued to Opperman on Nov. 2, 2004, discloses a door wiring system. U.S. Pat. No. 5,727,960, issued to Zehrung on Mar. 17, 1998, discloses a hinge for passing power. U.S. Pat. No. 4,839,939, issued to O'Brien, II on Jun. 20, 1989, discloses a security hinge with improved structural integrity with the electrical wires located along the pivot axis of the knuckles. U.S. Pat. No. 4,168,409, issued to McNinch on Sep. 18, 1979, discloses a security hinge with sealed switch and operator concealed therein. U.S. Pat. No. 6,725,504, issued to Dickson et al. on Apr. 27, 2004, discloses a hinge. U.S. Pat. No. 4,543,800, issued to Mawby et al. on Oct. 1, 1985, discloses refrigerator door hinge. U.S. Pat. No. 4,284,861, issued to Senften on Aug. 18, 1981, discloses a switch hinge. U.S. Pat. No. 5,717,380, issued to Zehrung on Feb. 10, 1998, discloses a monitor hinge. U.S. Patent Application Publication No. 2006/0017361, filed by Rendell et al. and published on Jan. 26, 2006, discloses a hinge conduit casing.

The foregoing patent information reflects the state of the art of which the inventors are aware and is tendered with a view toward discharging the inventors' acknowledged duty of candor in disclosing information that may be pertinent to the patentability of the technology described herein. It is respectfully stipulated, however, that the foregoing patent and other information do not teach or render obvious, singly or when considered in combination, the inventors' claimed invention.

BRIEF SUMMARY OF THE INVENTION

In various exemplary embodiments, the technology described herein provides a device, system, and associated methods for a hinge configured to receive a conduit adapted to receive and pass through a medium of power transfer.

In one exemplary embodiment, the technology described herein provides a hinge. The hinge includes: a first hinge leaf; a second hinge leaf interleaved with the first hinge leaf; a housing defined within a posterior side of at least one of the first hinge leaf and the second hinge leaf and configured to receive a conduit adapted to receive and pass through a medium of power transfer from the first hinge leaf to the second hinge leaf on an anterior side of the first hinge leaf and second hinge leaf; and an aperture defined on the anterior side of at least one of the first hinge leaf and the second hinge leaf through which to access the housing.

The hinge also can include: a first housing defined within a first posterior side of the first hinge leaf; a second housing defined within a second posterior side the second hinge leaf; a first aperture defined on a first anterior side of the first hinge leaf, through which to access the first housing; and a second aperture defined on a second anterior side of the second hinge leaf, through which to access the second housing.

The hinge further can include: a first turret assembly, disposed within first housing, and having a first fitting to secure a first portion of the conduit and allow omni-directional movement of the conduit; and a second turret assembly, disposed within the second housing, and having a second fitting to secure a second portion of the conduit and allow omni-directional movement of the conduit. The first turret assembly and the second turret assembly each further can include a rotating housing. The first fitting and the second fitting can be each a fixed fitting disposed one within each rotating housing.

The hinge also can include: a first ball-and-socket assembly, disposed within first housing, and having a first fitting to secure a first portion of the conduit and allow omni-directional movement of the conduit; and a second ball-and-socket assembly, disposed within the second housing, and having a second fitting to secure a second portion of the conduit and allow omni-directional movement of the conduit.

The hinge further can include: a track defined with the housing and configured to receive a fitting for a conduit to allow the fitting to slide within the track.

The hinge also can include: a flexible conduit, braided conduit, or flexible cable tray assembly disposed within the housing, wherein an open motion to the hinge extends the flexible conduit assembly from the housing, and wherein a close motion to the hinge retracts the flexible conduit assembly into the housing; and an end cap disposed upon a distal end of the flexible conduit assembly to prevent overextension. A seating spring is utilized to provide a tension and retract the conduit to a nested position. Additionally, the seating spring provides structural security and safety by preventing the overextension, and potential crush of the flexible conduit if left overextended when a doors closes.

In another exemplary embodiment, the technology described herein provides a hinge assembly. The hinge assembly includes: a conduit; a hinge having a first hinge leaf and a second hinge leaf interleaved with the first hinge leaf; a housing defined within a posterior side of at least one of the first hinge leaf and the second hinge leaf and configured to receive the conduit, wherein the conduit is adapted to receive and pass through a medium of power transfer from the first hinge leaf to the second hinge leaf on an anterior side of the first hinge leaf and the second hinge leaf, and wherein the conduit extends outwardly from the housing as the hinge is opened and retracts inwardly into the housing as the hinge is closed; and an aperture defined on the anterior side of at least one of the first hinge leaf and the second hinge leaf through which to access the housing.

The conduit used is one or more of: flexible conduit, rigid conduit, rigid telescoping conduit, braided wire conduit, and elastic conduit. The conduit can be a conduit including at least one rigid portion and at least one flexible portion, wherein the rigid portion and the flexible portion are coupled one to another.

The hinge assembly also can include: a first housing defined within a first posterior side of the first hinge leaf; a second housing defined within a second posterior side the second hinge leaf; a first aperture defined on a first anterior side of the first hinge leaf, through which to access the first housing; and a second aperture defined on a second anterior side of the second hinge leaf, through which to access the second housing.

The hinge assembly further can include: a first turret assembly, disposed within first housing, and having a first fitting to secure a first portion of the conduit and allow omni-directional movement of the conduit; and a second turret assembly, disposed within the second housing, and having a second fitting to secure a second portion of the conduit and allow omni-directional movement of the conduit. The first turret assembly and the second turret assembly each can further include a rotating housing. The first fitting and the second fitting each can be a fixed fitting disposed within a rotating housing.

The hinge assembly also can include: a first ball-and-socket assembly, disposed within first housing, and having a first fitting to secure a first portion of the conduit and allow omni-directional movement of the conduit; and a second ball-and-socket assembly, disposed within the second housing, and having a second fitting to secure a second portion of the conduit and allow omni-directional movement of the conduit.

The hinge assembly further can include: a flexible conduit, braided conduit, or flexible cable tray assembly disposed within the housing, wherein an open motion to the hinge extends the flexible conduit assembly from the housing, and wherein a close motion to the hinge retracts the flexible conduit assembly into the housing; and an end cap disposed upon a distal end of the flexible conduit assembly to prevent overextension. A seating spring is utilized to provide a tension and retract the conduit to a nested position. Additionally, the seating spring provides structural security and safety by preventing the overextension, and potential crush of the flexible conduit if left overextended when a doors closes.

The hinge assembly also can include: a track defined with the housing and configured to receive a fitting for a conduit to allow the fitting to slide within the track.

In another exemplary embodiment, the technology described herein provides a door assembly. The door assembly includes: a door; a conduit; at least one power transfer hinge, disposed upon the door to provide a means by which the door is hung, opened, and closed, and through which the conduit passes on an anterior side of the hinge, the hinge comprising a first hinge leaf and a second hinge leaf interleaved with the first hinge leaf; a housing defined within a posterior side of at least one of the first hinge leaf and the second hinge leaf and configured to receive the conduit, wherein the conduit is adapted to receive and pass through a medium of power transfer from the first hinge leaf to the second hinge leaf on an anterior side of the first hinge leaf and the second hinge leaf, and wherein the conduit extends outwardly from the housing as the hinge is opened and retracts inwardly into the housing as the hinge is closed; and an aperture defined on the anterior side of at least one of the first hinge leaf and the second hinge leaf through which to access the housing.

Advantageously, the hinge disclosed herein can accommodate CAT-5, and other large gauge wires, and multiple wires, and other mediums of exchange. Also advantageously, the installation and use of the hinge disclosed herein does not require extensive coordination between a client, distributor, and vendor. Further advantageously, the hinge disclosed herein is easily serviced and can bear large loads while providing a means of power transfer.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a device, system, and associated methods for a hinge, hinge assembly, and door assembly. In each embodiment a hinge is configured to receive a conduit adapted to receive and pass through a medium of power transfer. Power transfer is accommodated in various embodiments, for electrical, optical, pneumatic, hydraulic, and the like, power transfer mediums. Additionally, in various embodiments, the hinge assembly includes an embedded switch. It at least one embodiment, the hinge embedded switch carries only power. In at least one alternative embodiment, the hinge embedded switch is a signal switch that does not carry current.

Figure 1:
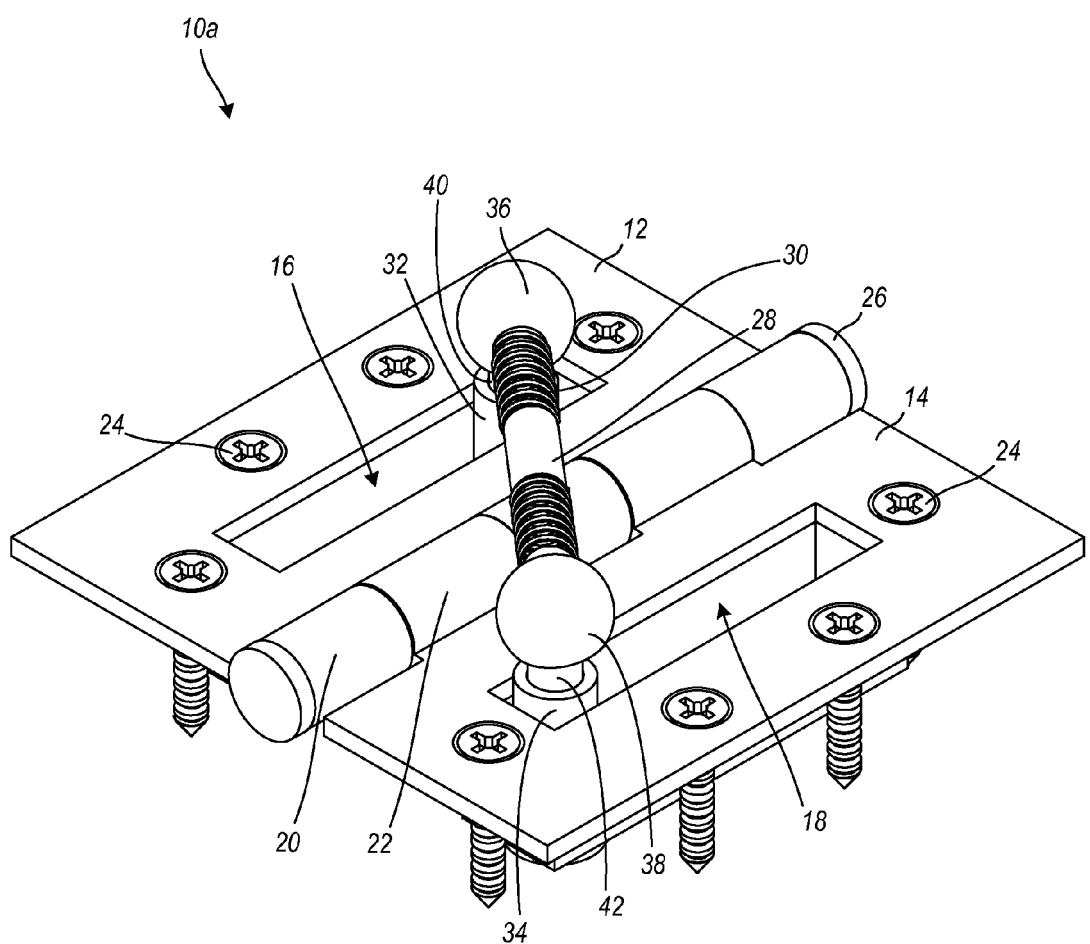
FIG. 1 is a front perspective view of a hinge assembly, illustrating, in particular, a flexible conduit in combination with a rigid middle portion having ball-and-socket connections to fixed turrets, according to an embodiment of the technology described herein.
Figure 2:
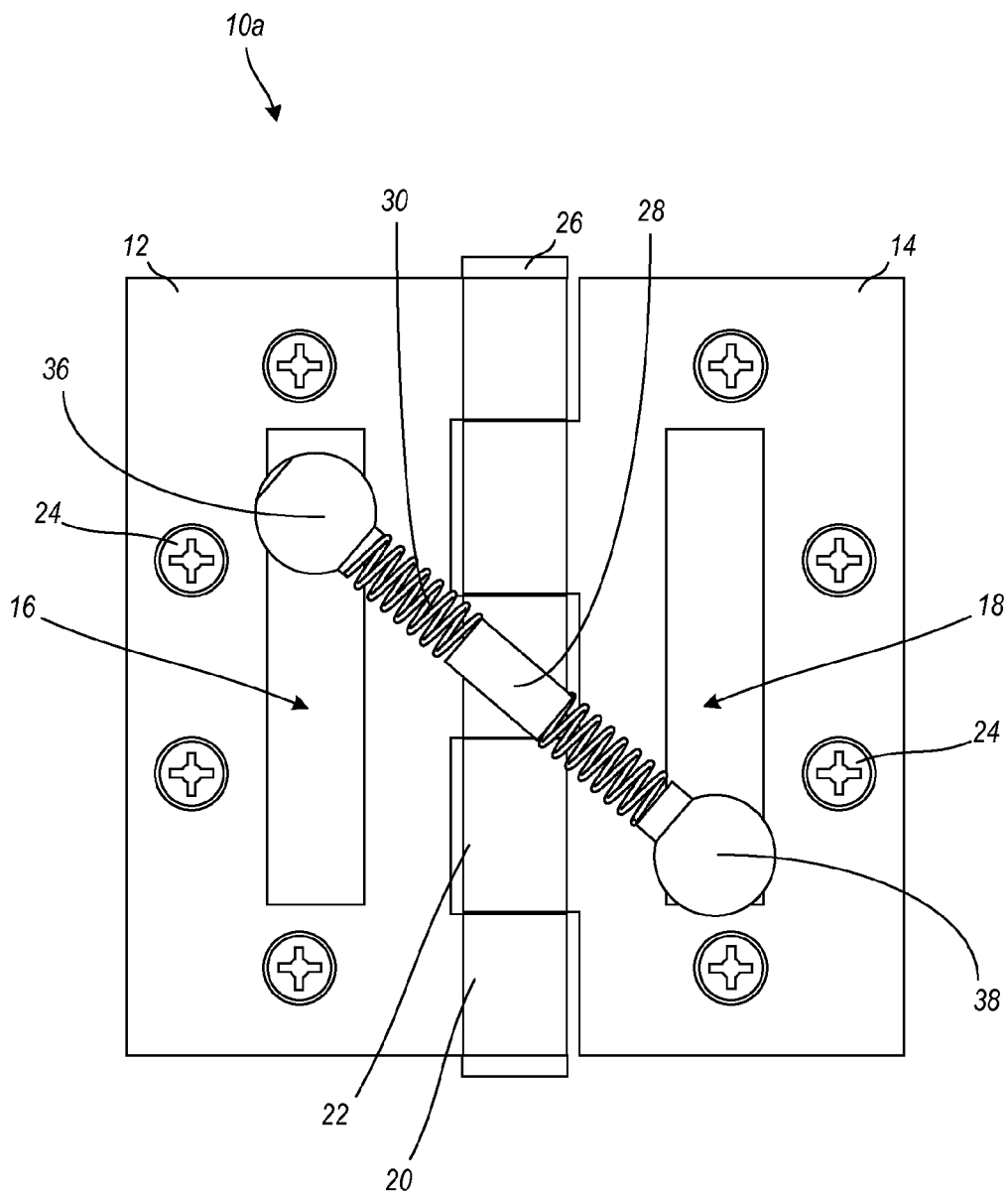
FIG. 2 is a front planar view of the hinge assembly depicted in FIG. 1.
Figure 3:
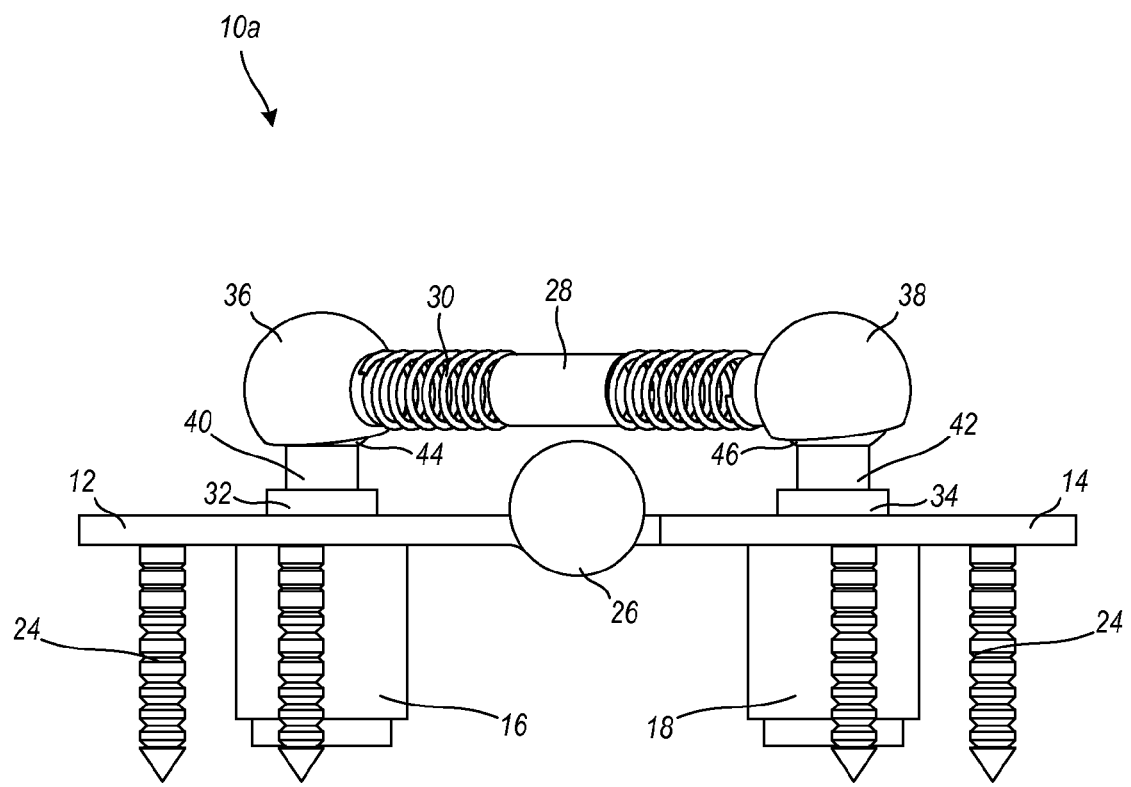
FIG. 3 is an end planar view of the hinge assembly depicted in FIG. 1.
Figure 4:
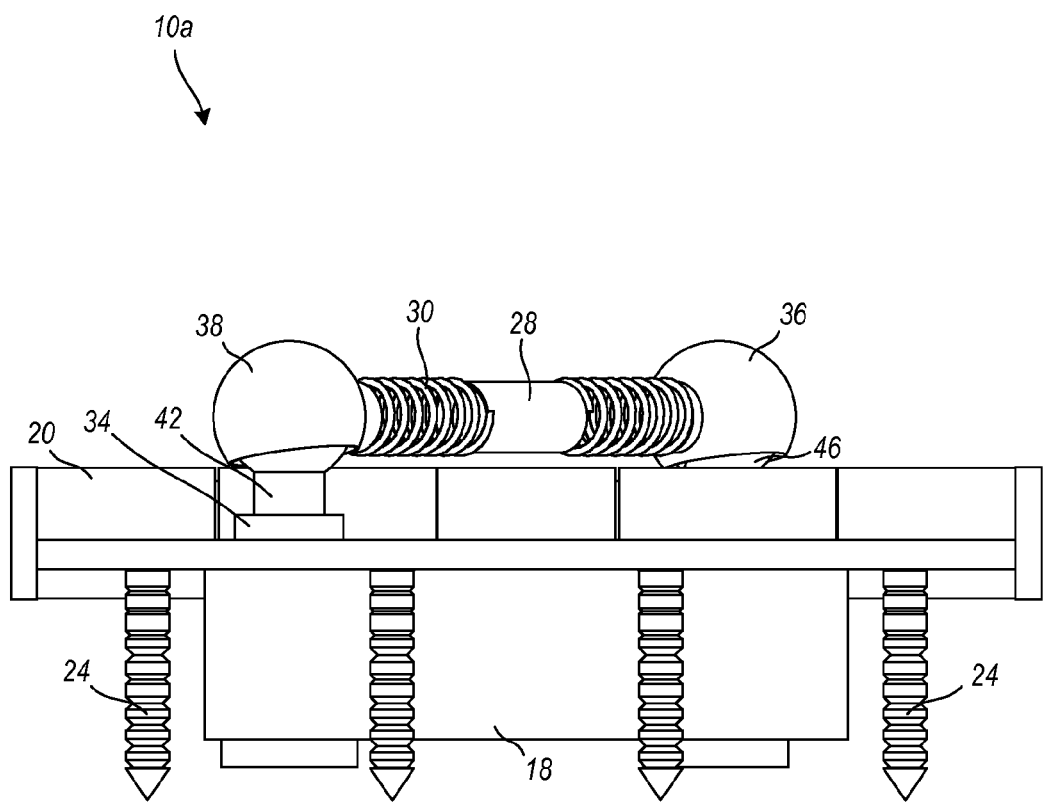
FIG. 4 is side planar view of the hinge assembly depicted in FIG. 1.
Figure 5:
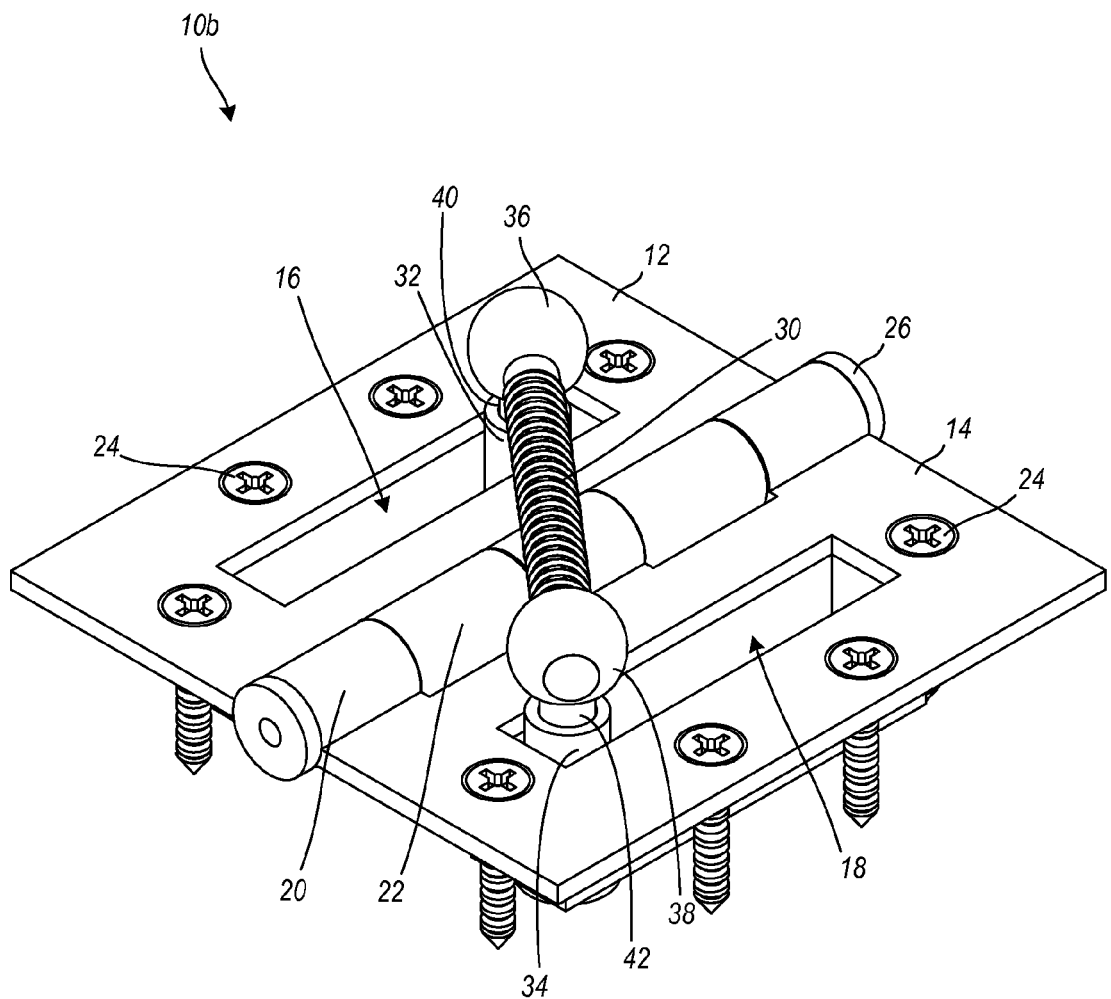
FIG. 5 is a front perspective view of a hinge assembly, illustrating, in particular, a flexible conduit having ball-and-socket connections to fixed turrets, according to an embodiment of the technology described herein.
Figure 6:
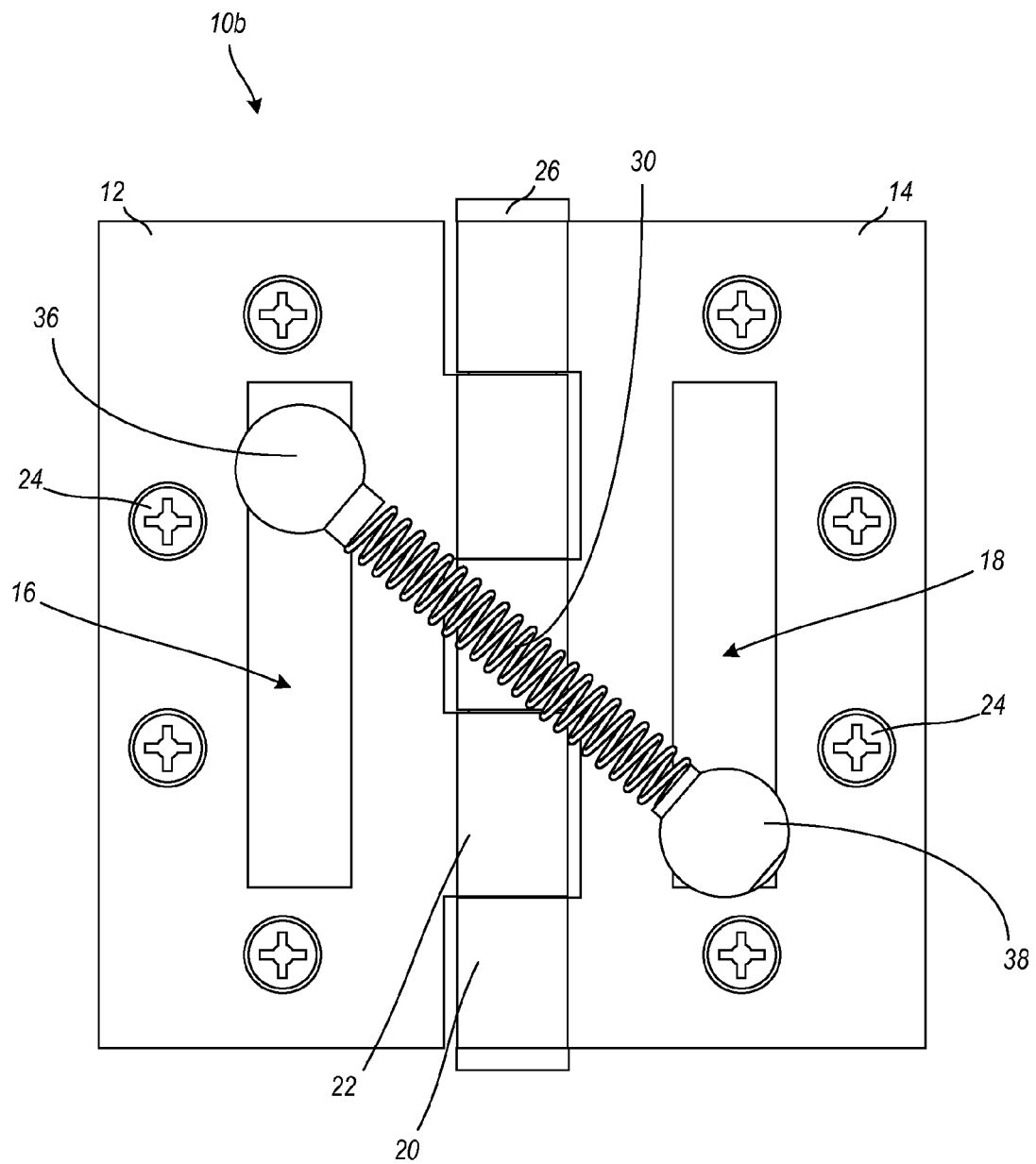
FIG. 6 is a front planar view of the hinge assembly depicted in FIG. 5.
Figure 7:
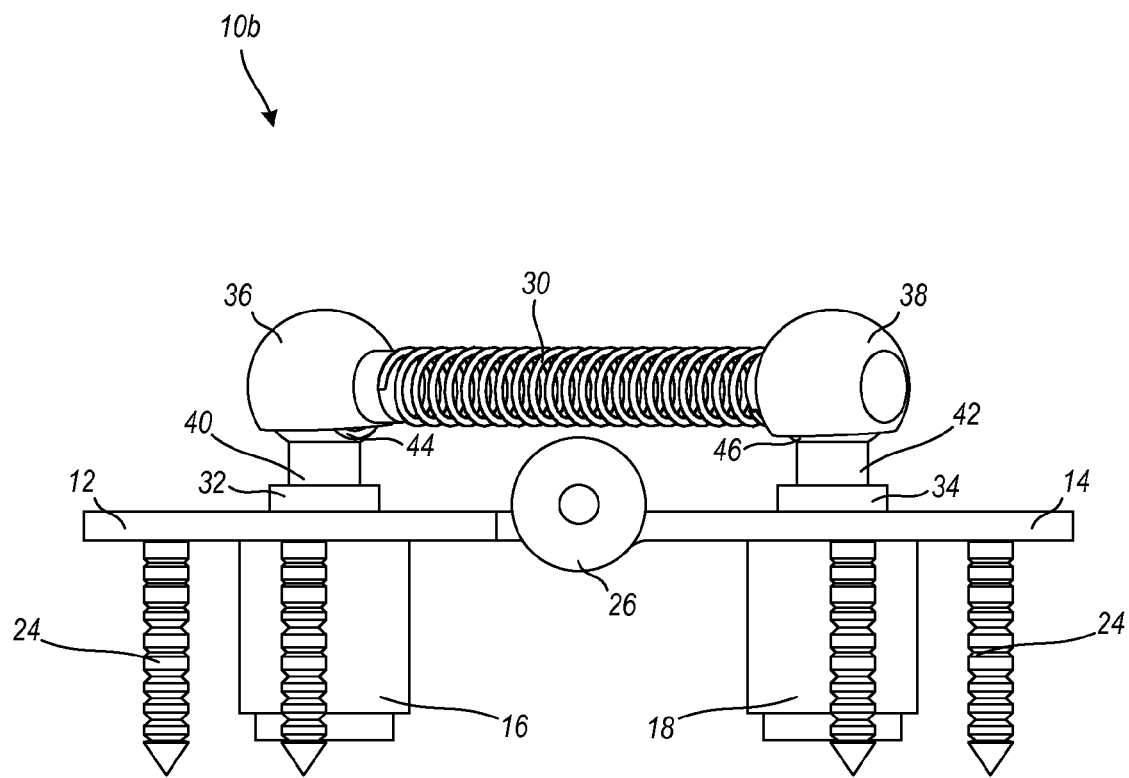
FIG. 7 is an end planar view of the hinge assembly depicted in FIG. 5.
Figure 8:
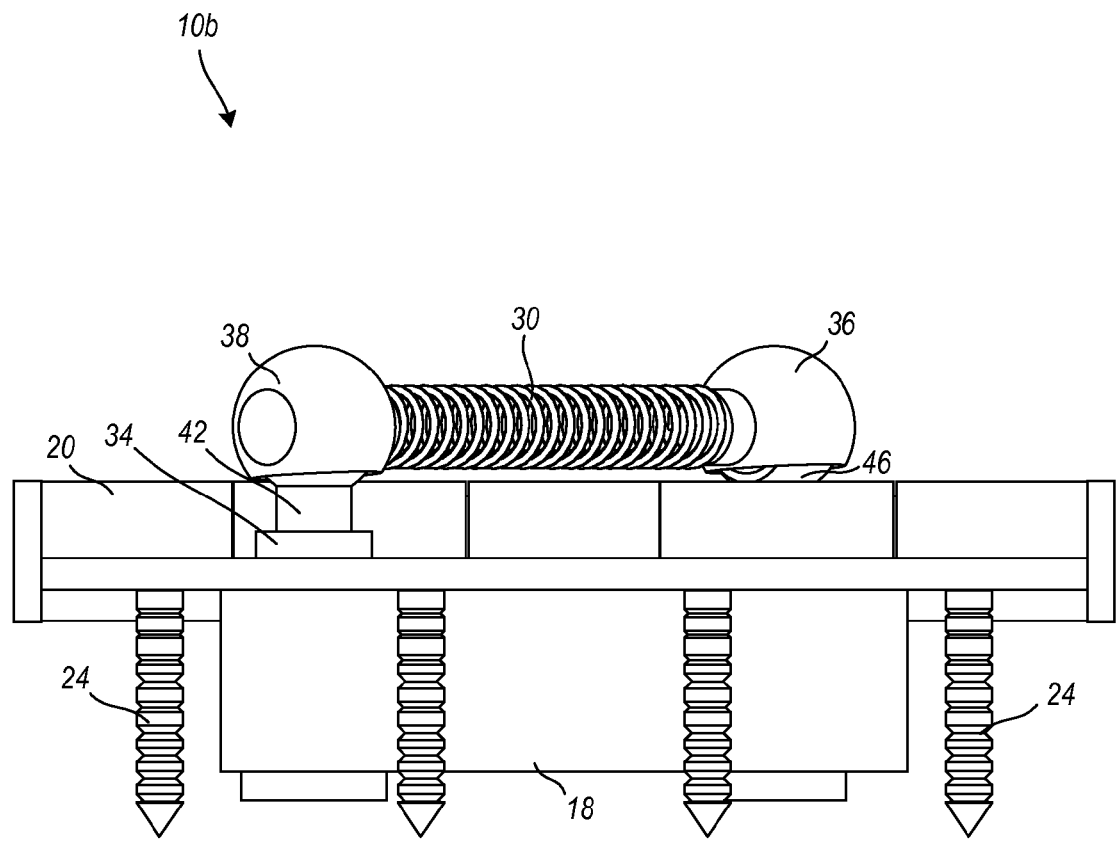
FIG. 8 is side planar view of the hinge assembly depicted in FIG. 5.
Figure 9:
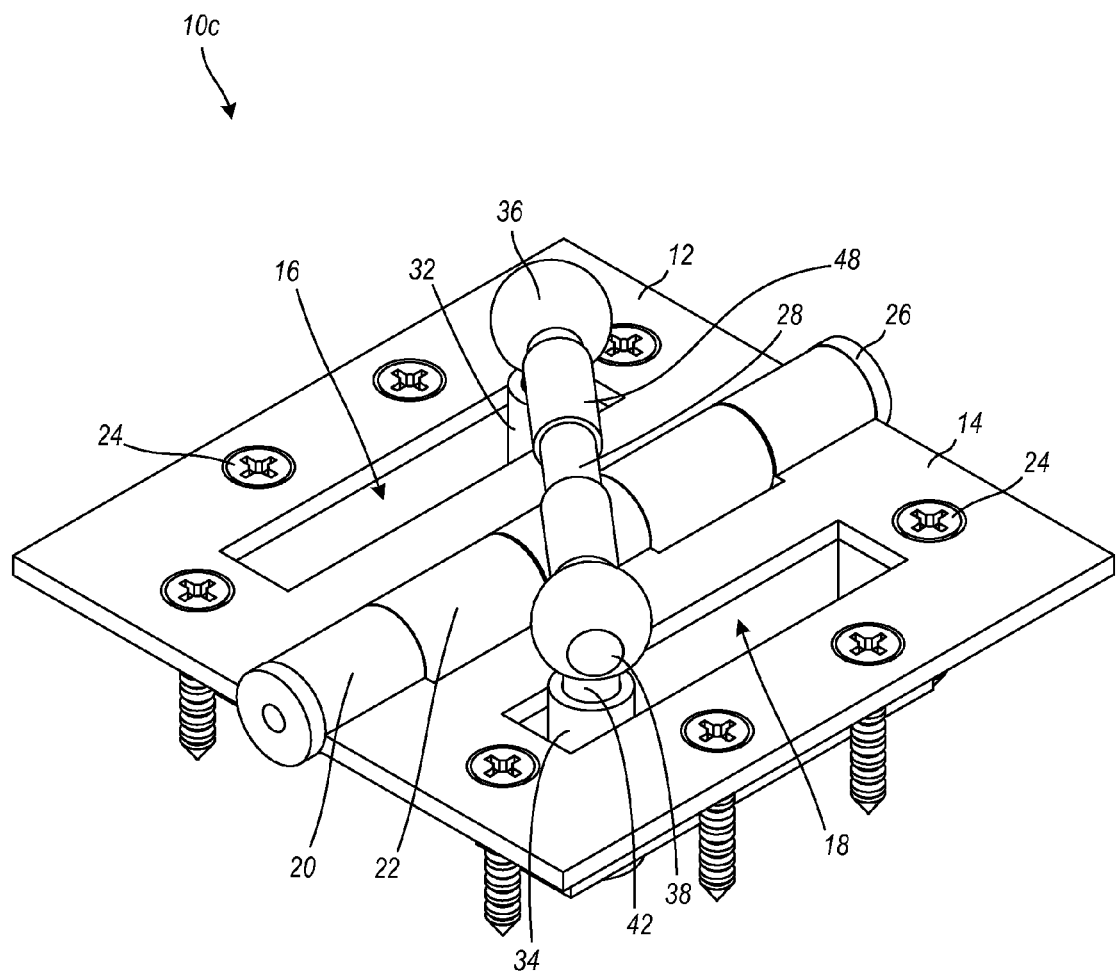
FIG. 9 is a front perspective view of a hinge assembly, illustrating, in particular, an elastic or braided wire embodiment of the flexible conduit, according to an embodiment of the technology described herein.
Figure 10:
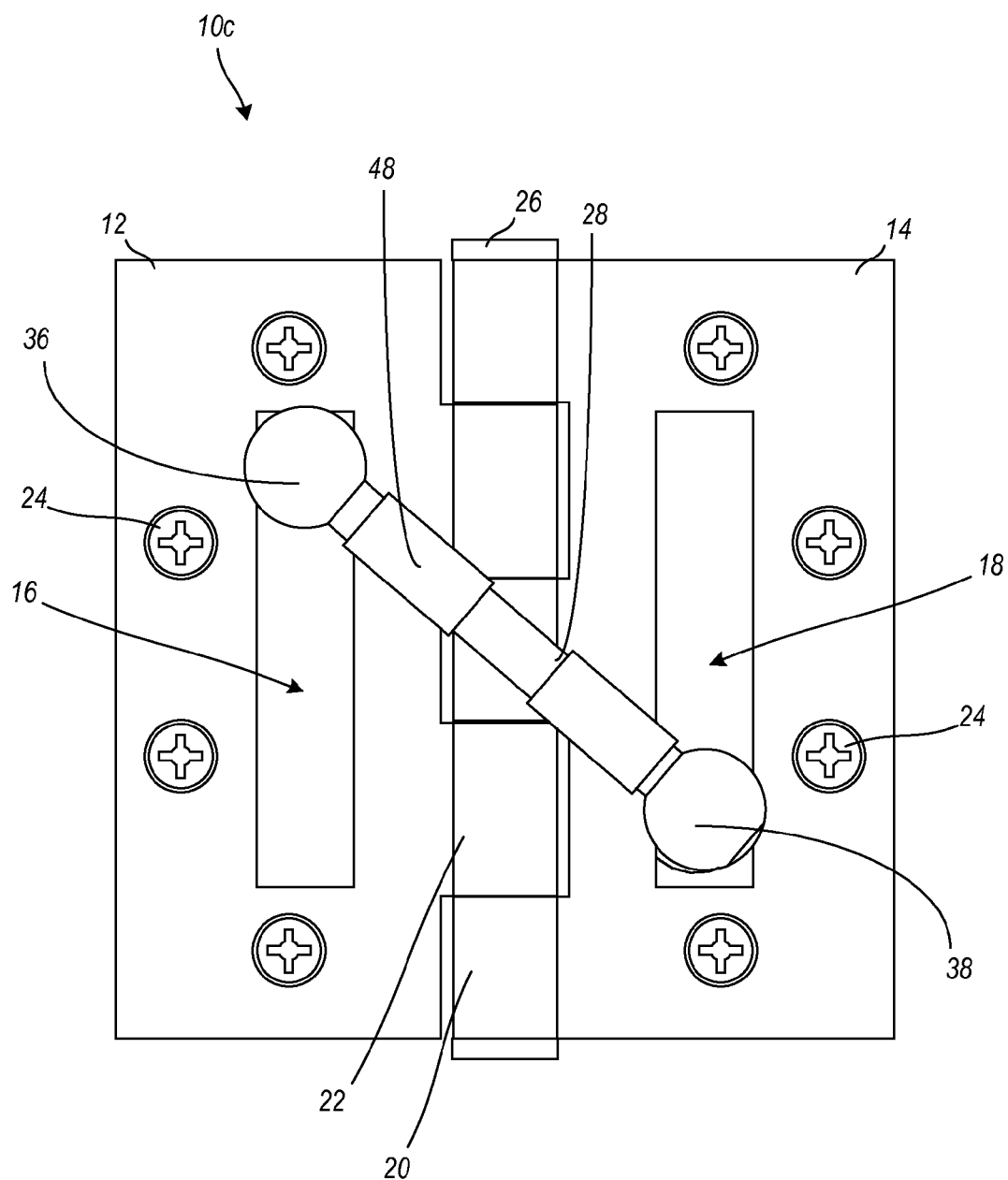
FIG. 10 is a front planar view of the hinge assembly shown in FIG. 9.
Figure 11:
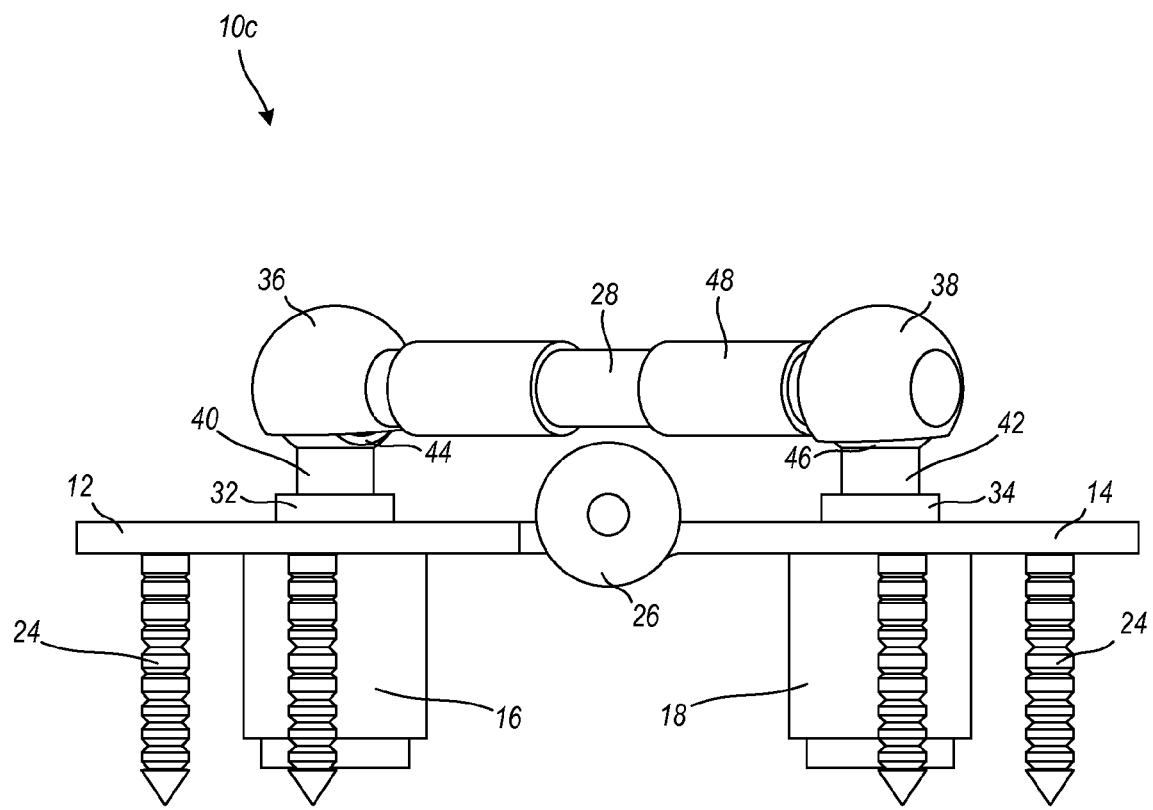
FIG. 11 is an end planar view of the hinge assembly shown in FIG. 9.
Figure 12:
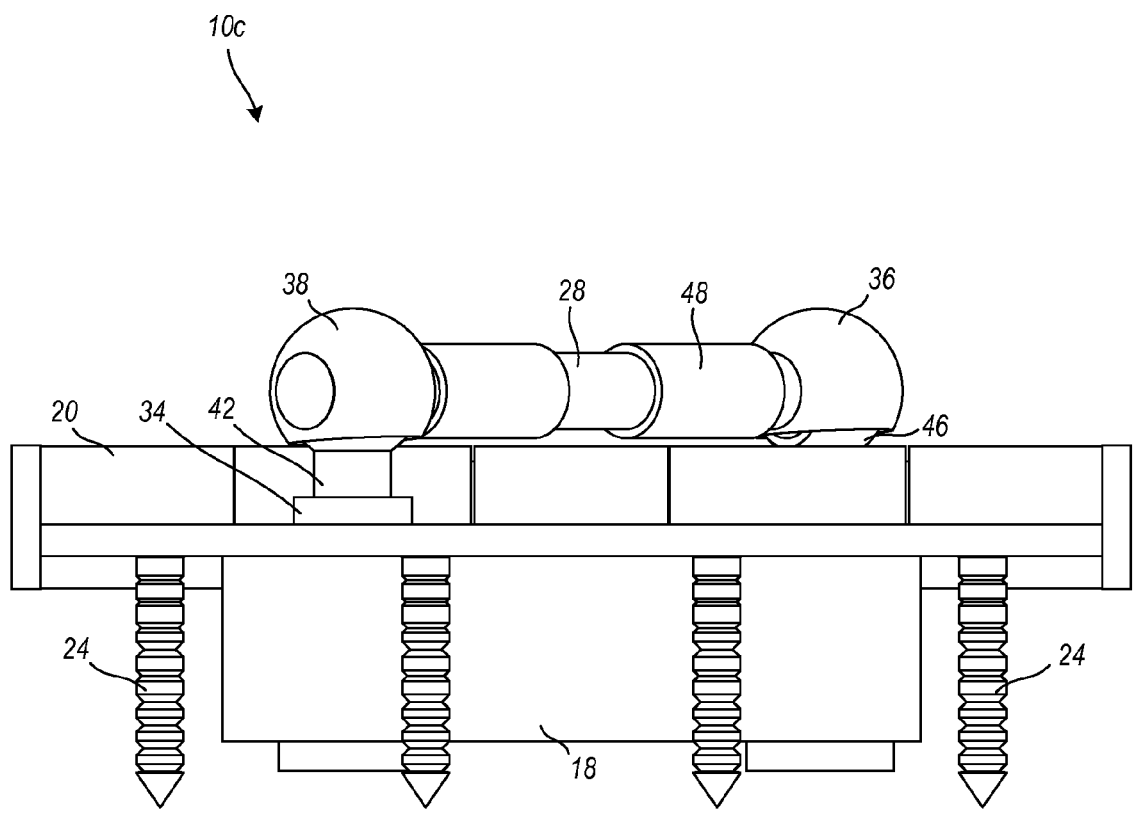
FIG. 12 is side planar view of the hinge assembly depicted in FIG. 9.
Figure 13:
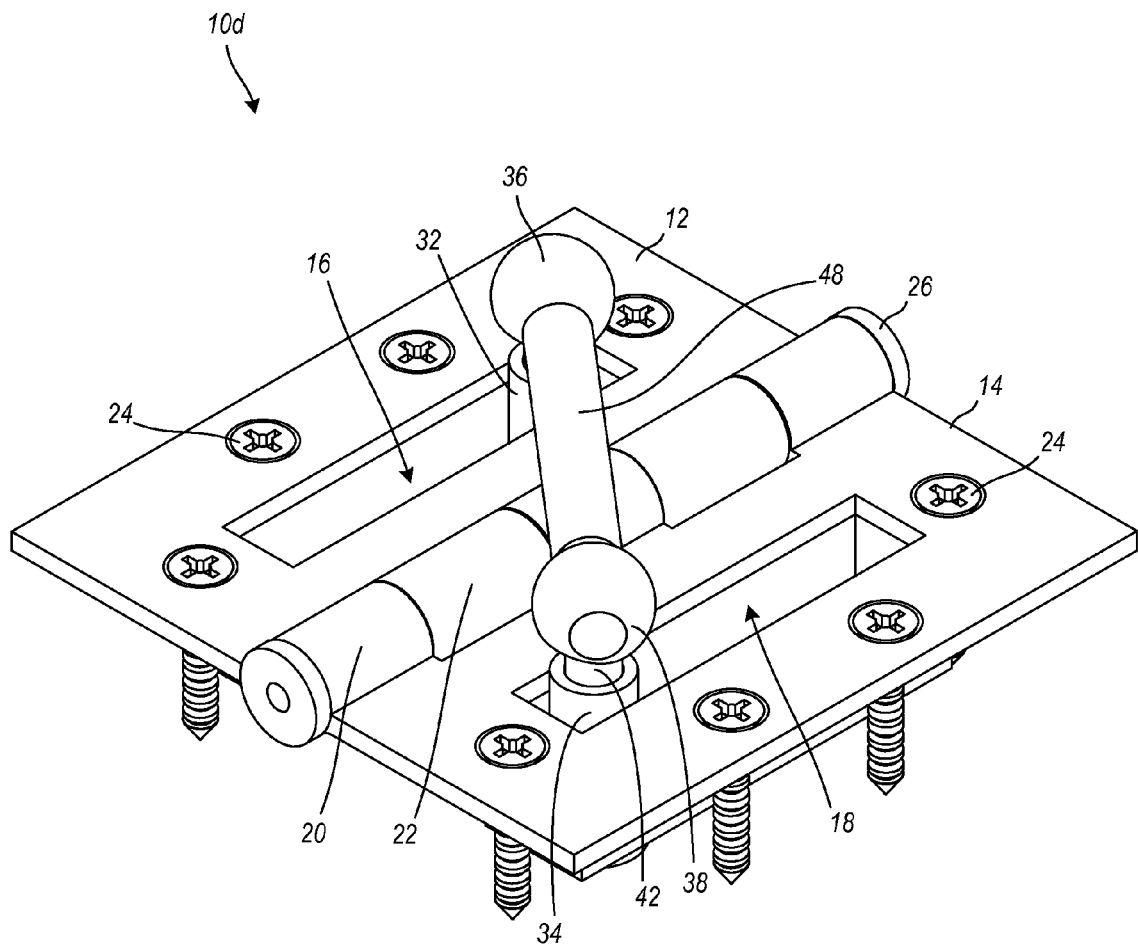
FIG. 13 is a front perspective view of a hinge assembly, illustrating, in particular, a full width flexible conduit embodiment, according to an embodiment of the technology described herein.
Figure 14:
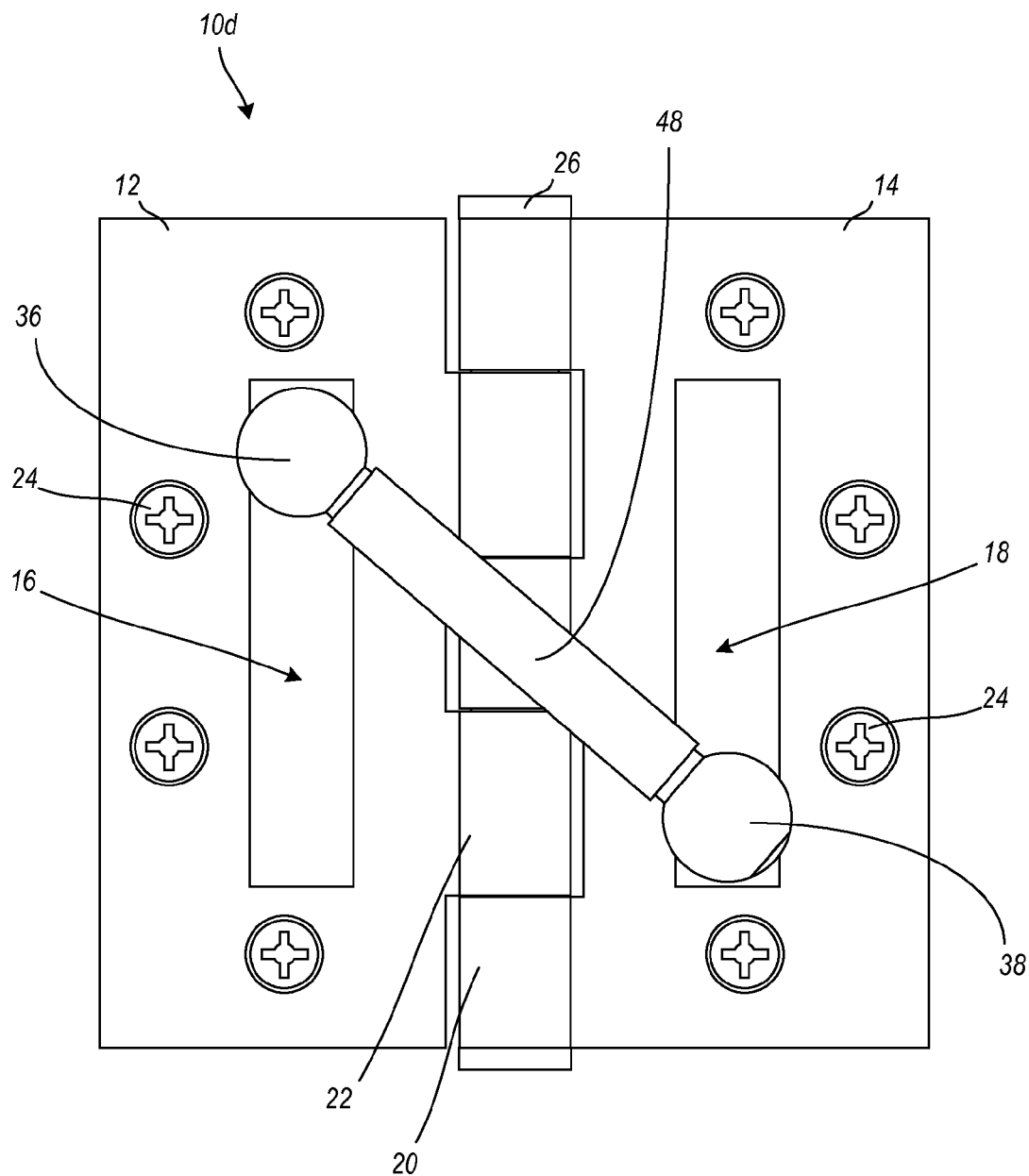
FIG. 14 is a front planar view of the hinge assembly shown in FIG. 13.
Figure 15:
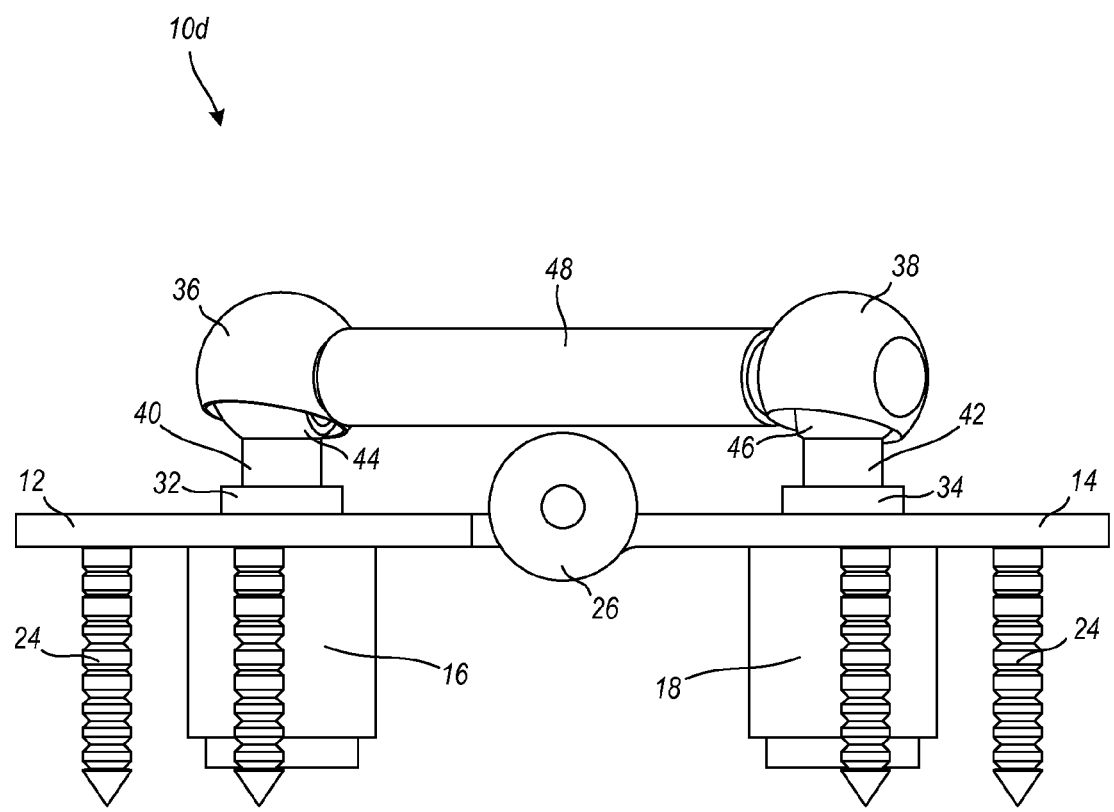
FIG. 15 is an end planar view of the hinge assembly shown in FIG. 13.
Figure 16:
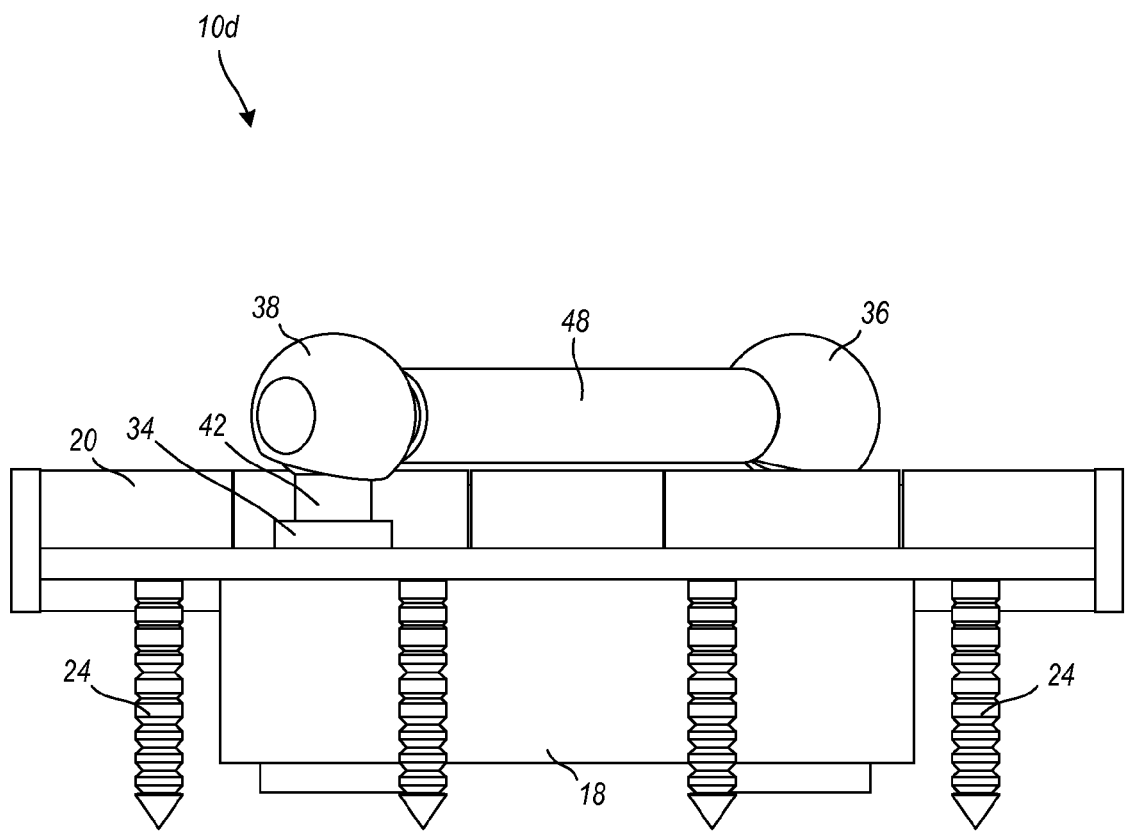
FIG. 16 is side planar view of the hinge assembly depicted in FIG. 13.
Figure 17:
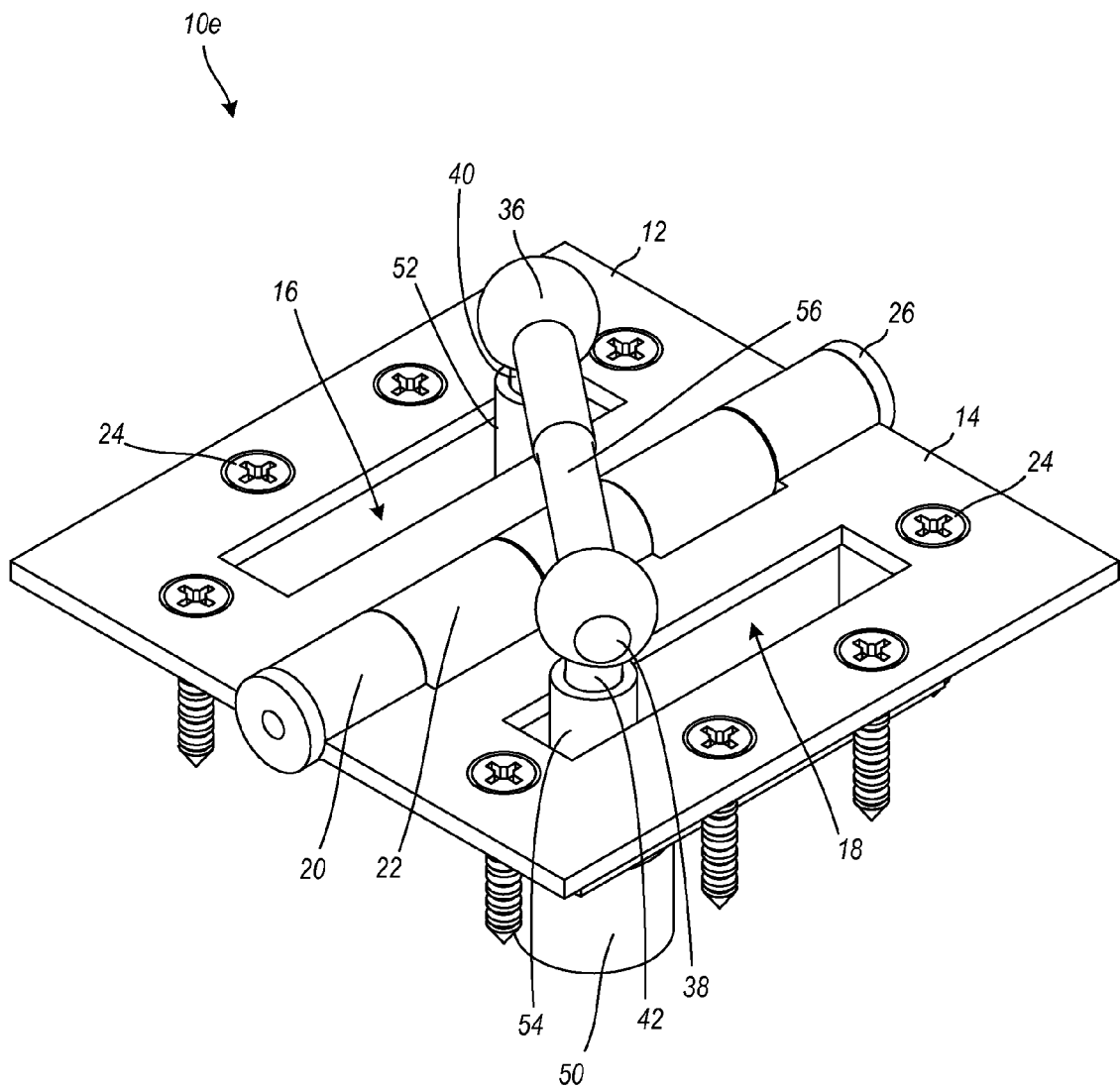
FIG. 17 is a front perspective view of a hinge assembly, illustrating, in particular, a rigid telescoping conduit having ball-and-socket connections to spring-loaded turrets, according to an embodiment of the technology described herein.
Figure 18:
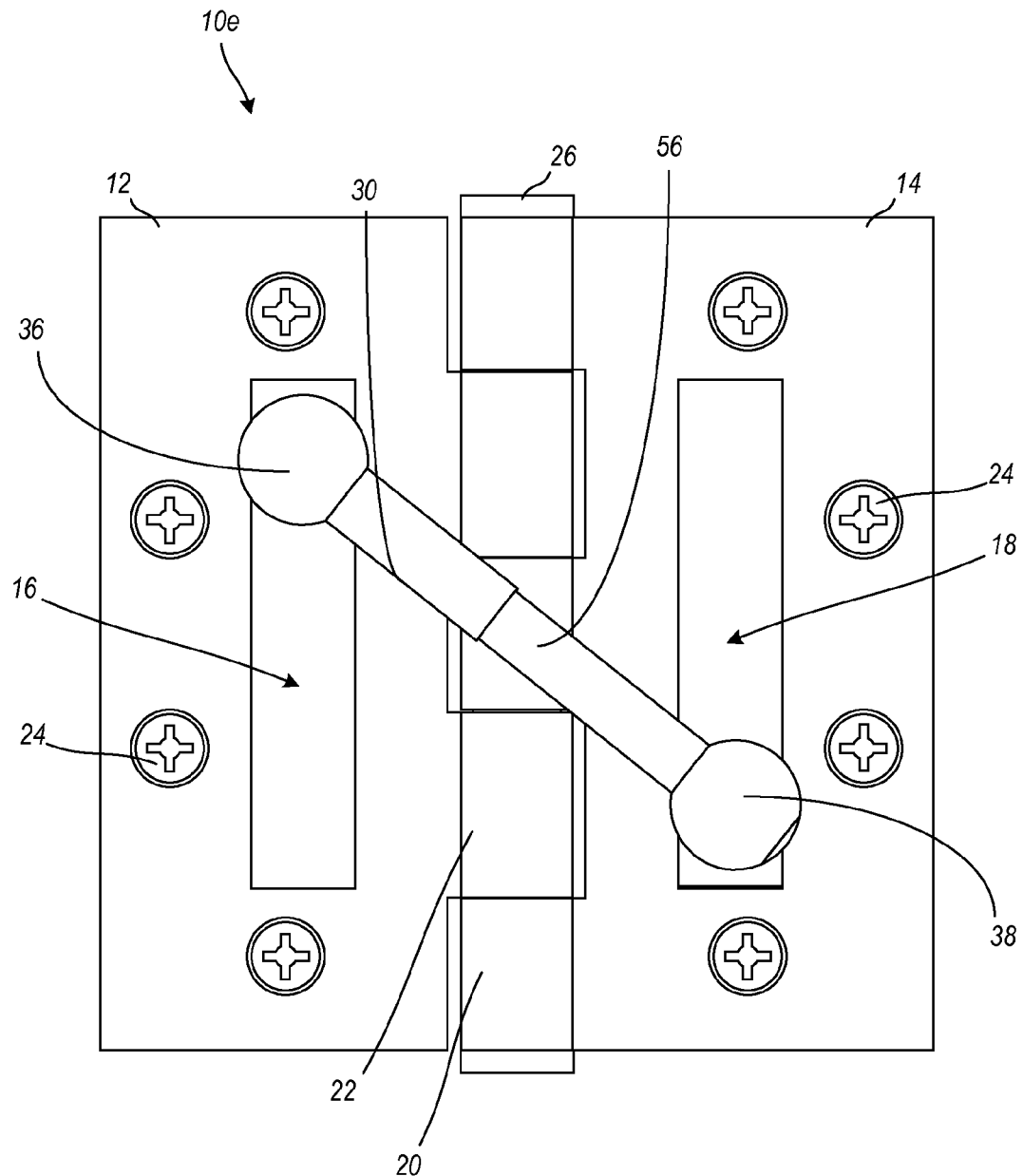
FIG. 18 is a front planar view of the hinge assembly shown in FIG. 17.
Figure 19:
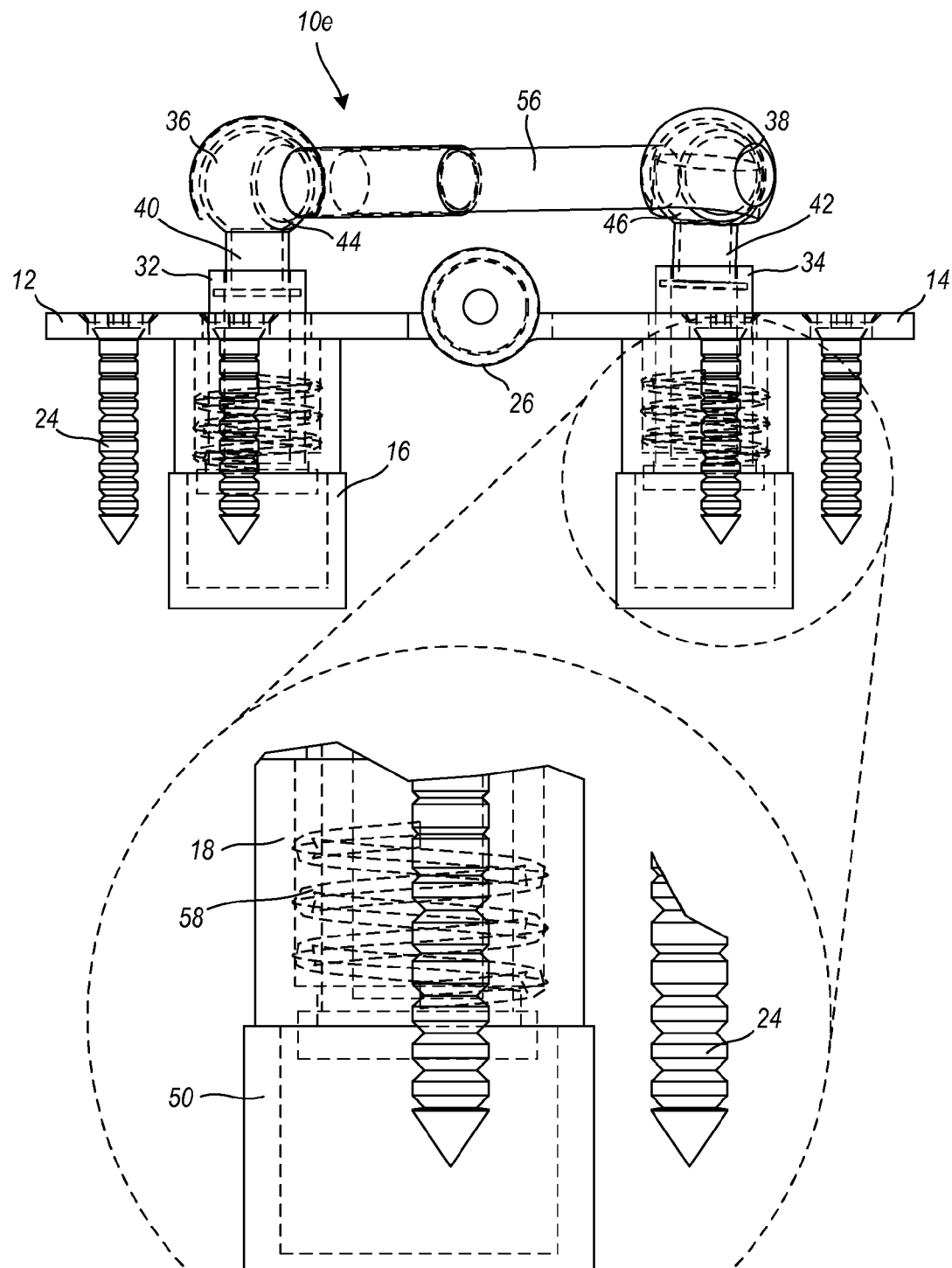
FIG. 19 is an end planar view of the hinge assembly shown in FIG. 17.
Figure 20:
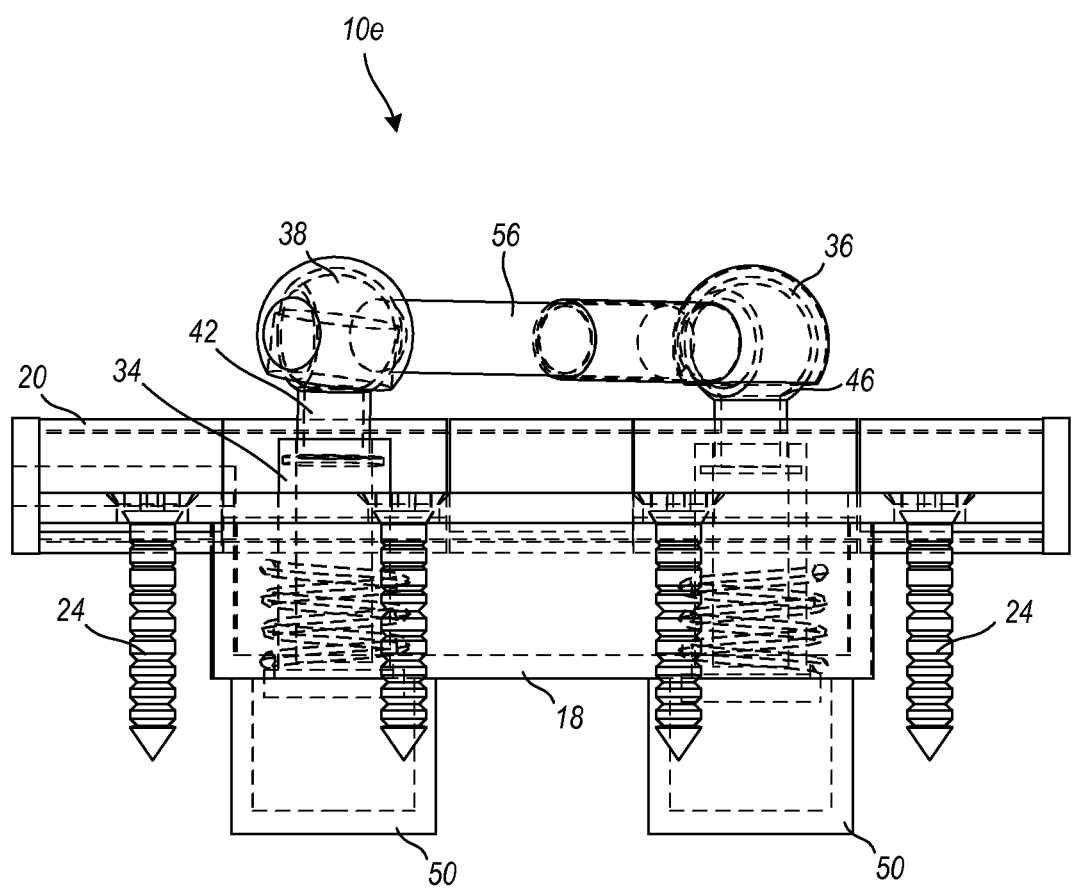
FIG. 20 is side planar view of the hinge assembly depicted in FIG. 17.
Figure 21:
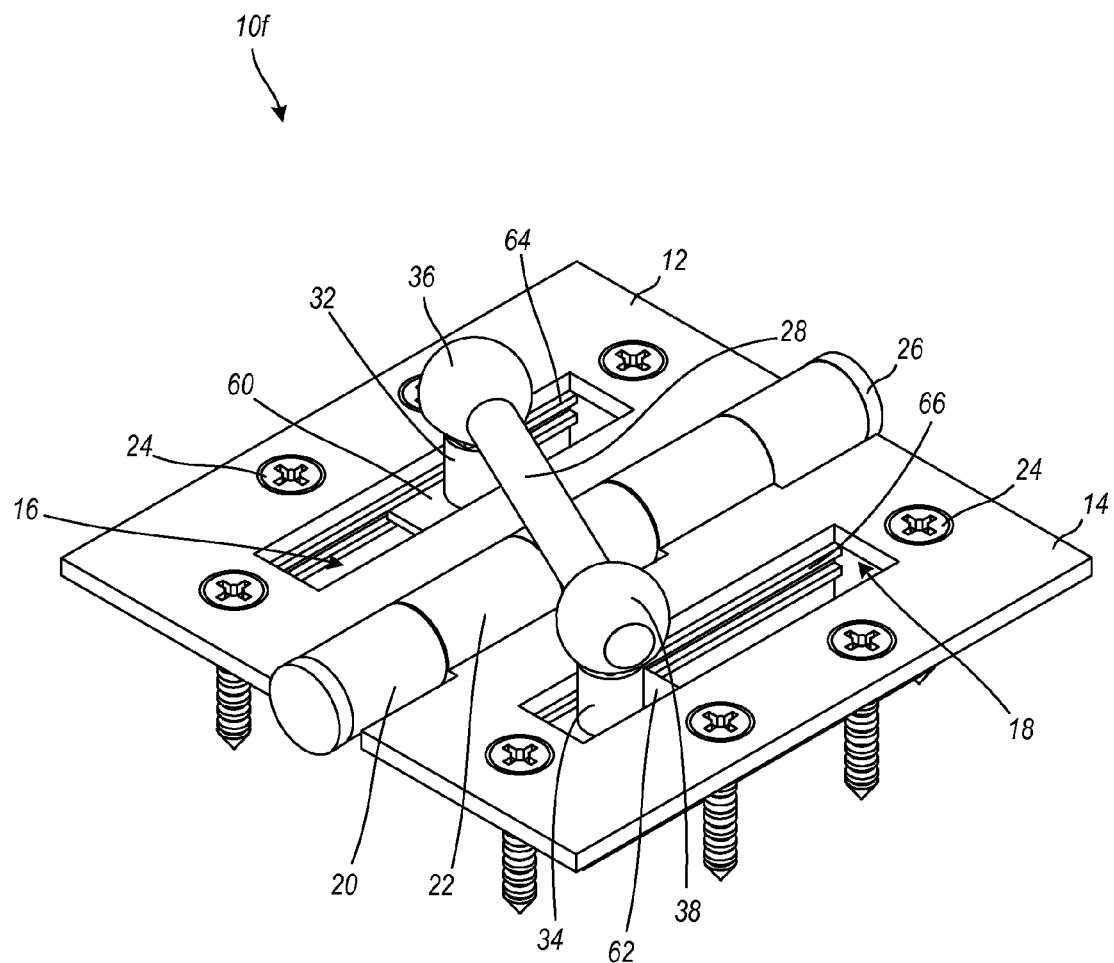
FIG. 21 is a front perspective view of a hinge assembly, illustrating, in particular, a rigid conduit having ball-and-socket connections each having a track within which to slide in the conduit housing, according to an embodiment of the technology described herein.
Figure 22:
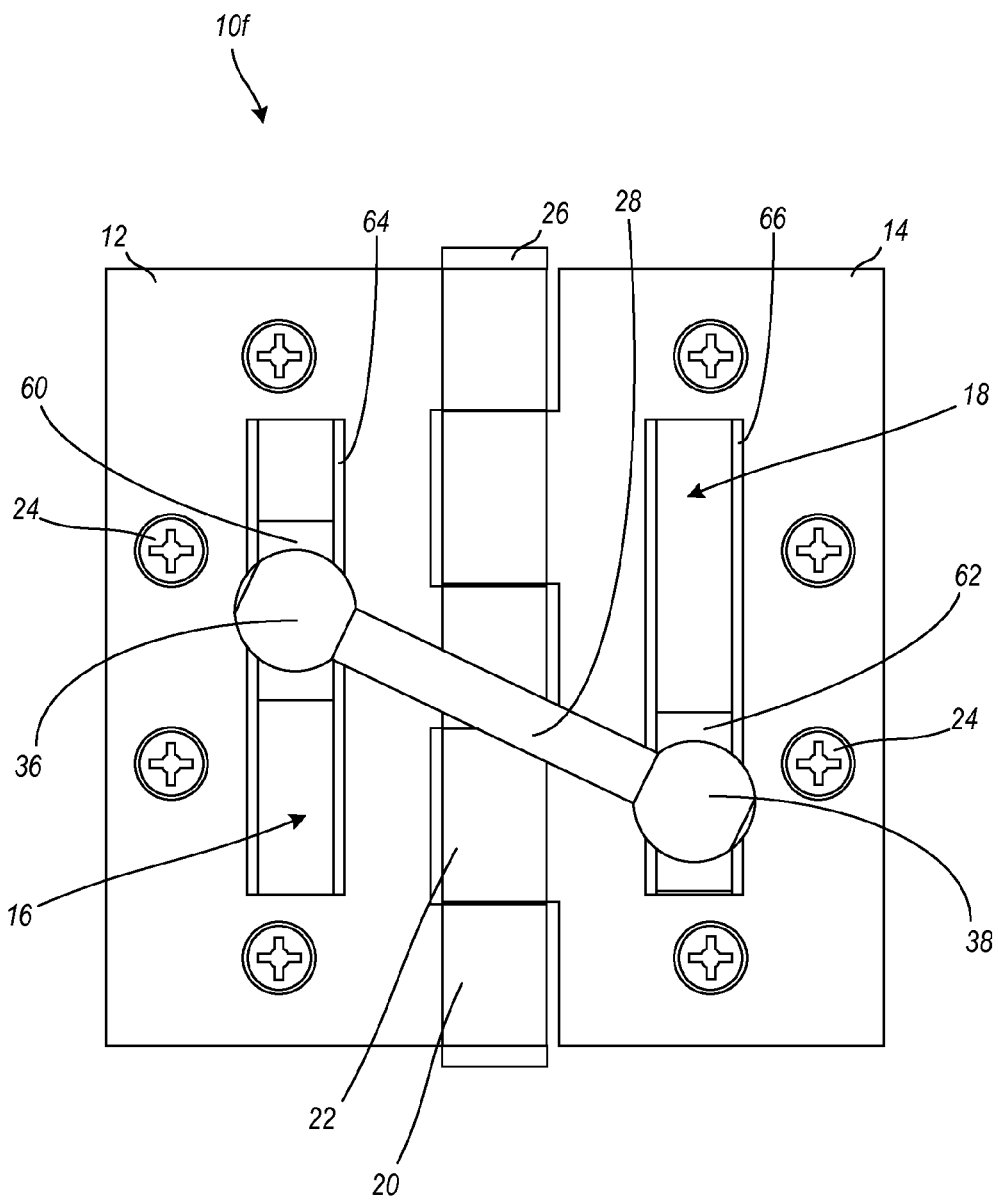
FIG. 22 is a front planar view of the hinge assembly shown in FIG. 21.
Figure 23:
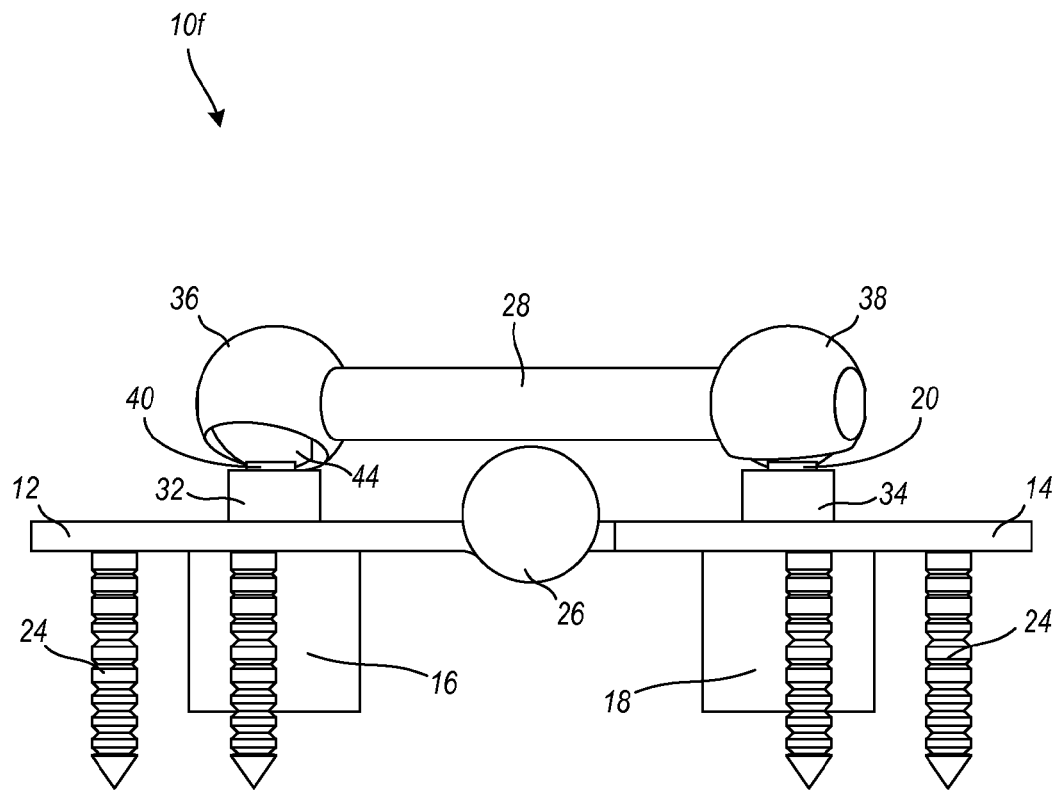
FIG. 23 is an end planar view of the hinge assembly shown in FIG. 21.
Figure 24:
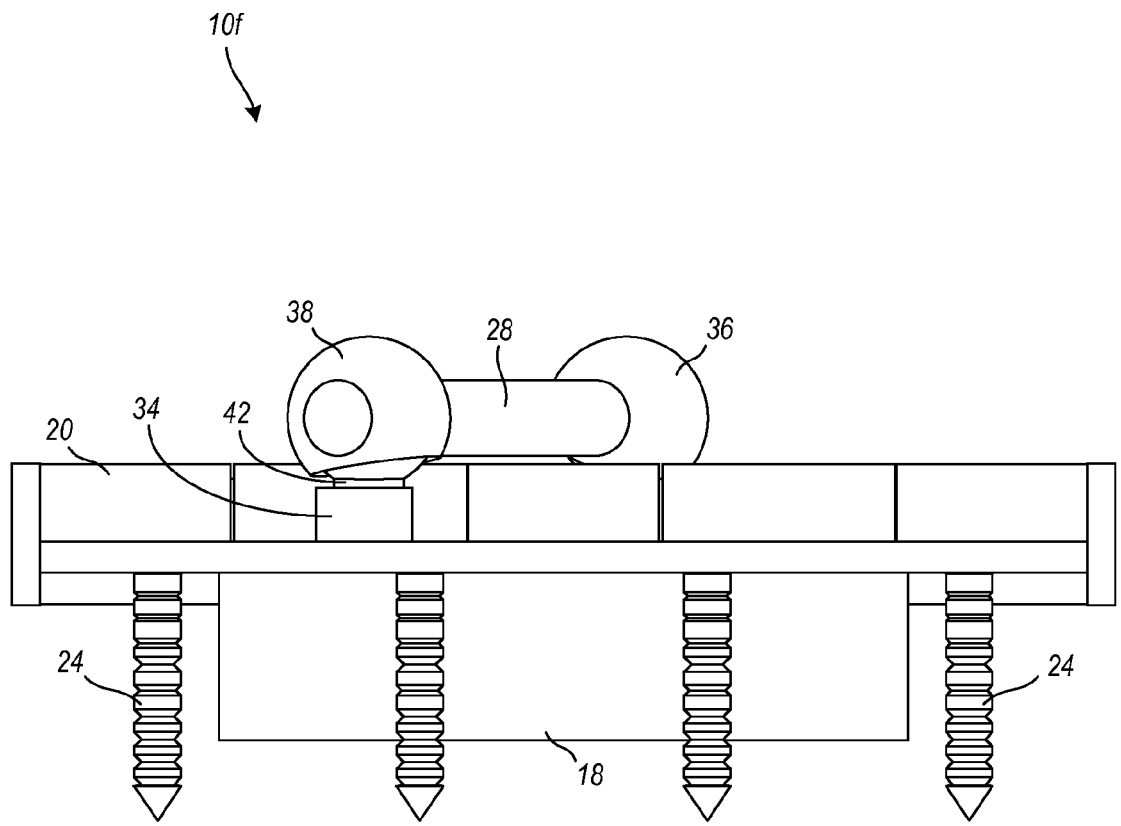
FIG. 24 is side planar view of the hinge assembly depicted in FIG. 21.
Figure 25:
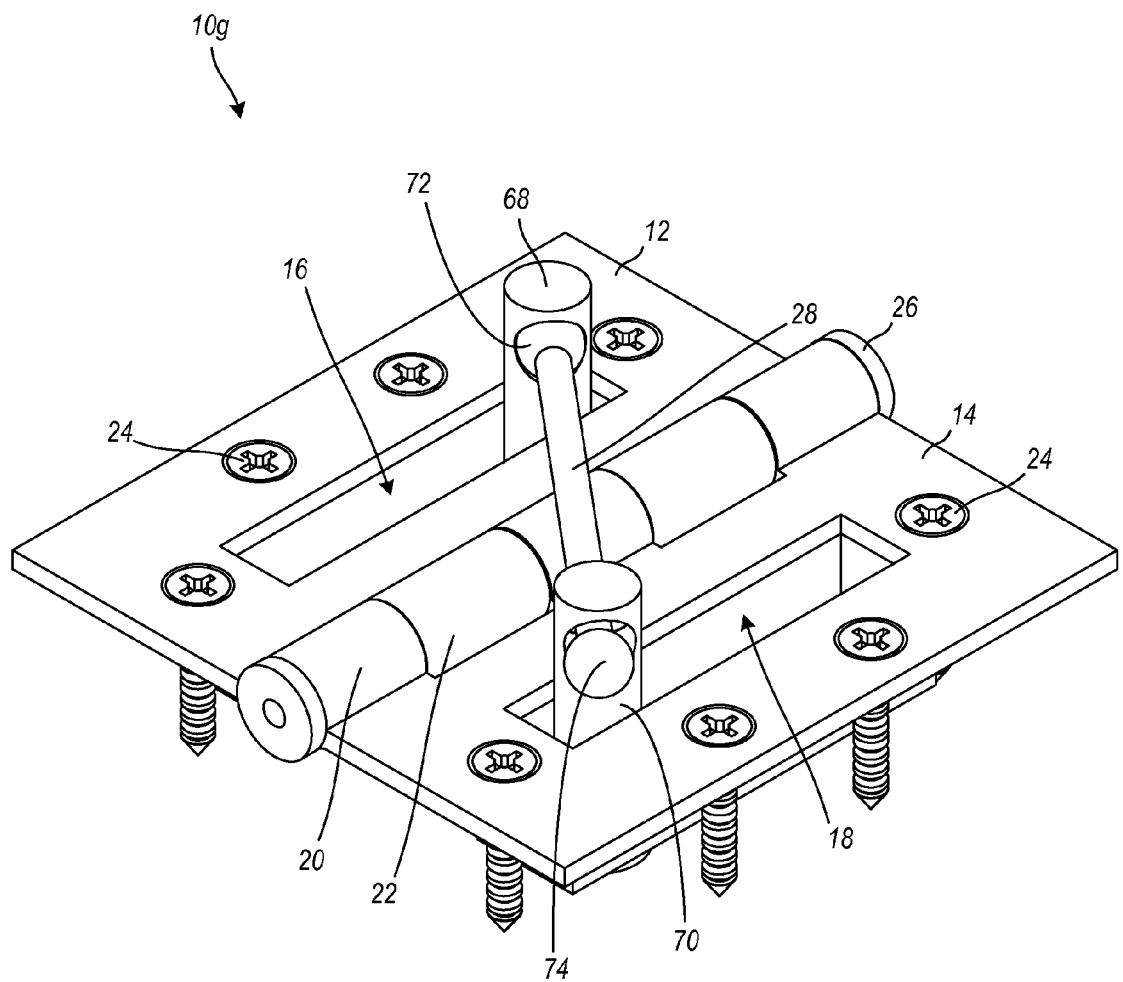
FIG. 25 is a front perspective view of a hinge assembly, illustrating, in particular, an inverse ball-and-socket embodiment, according to an embodiment of the technology described herein.
Figure 26:
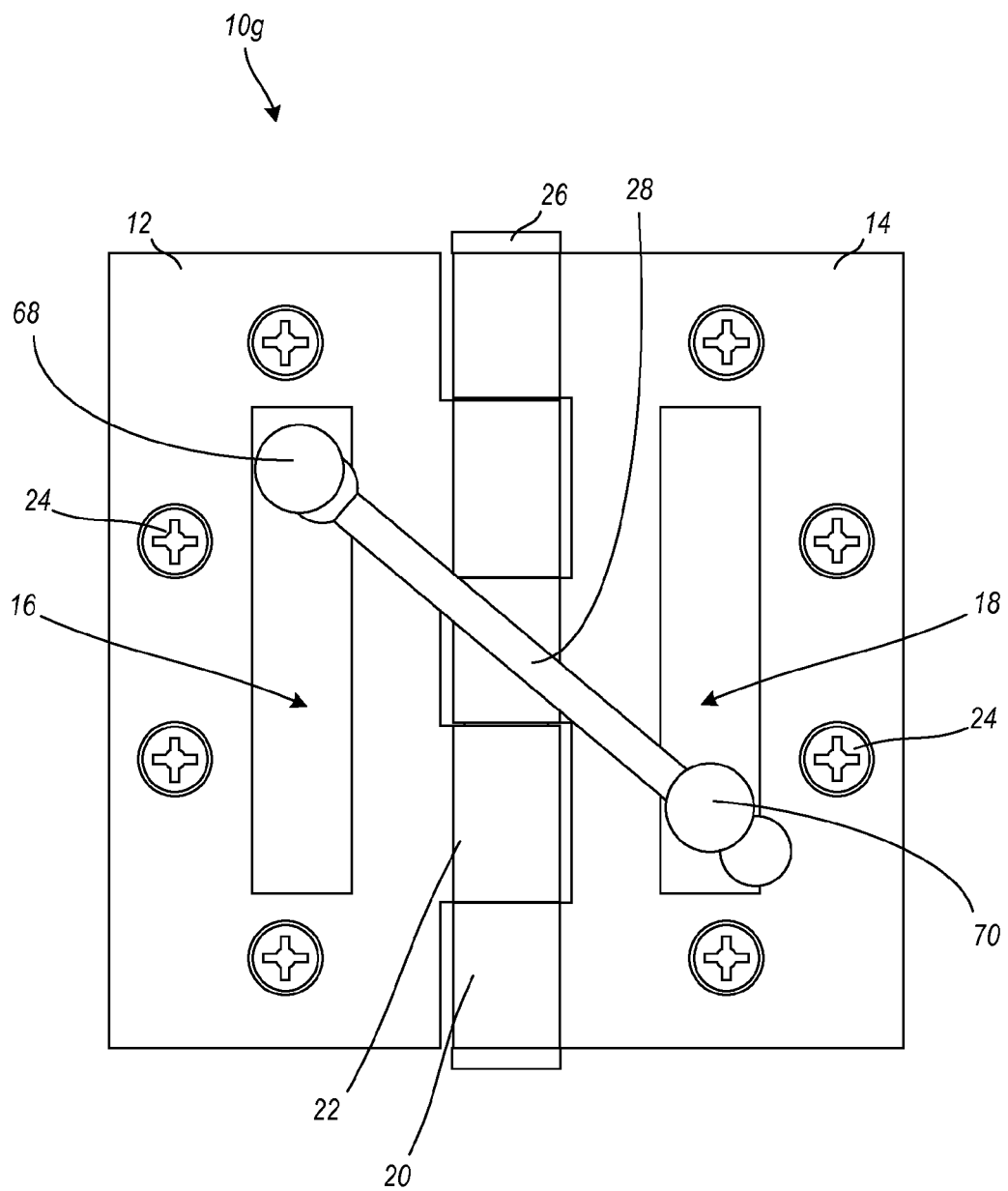
FIG. 26 is a front planar view of the hinge assembly shown in FIG. 25.
Figure 27:
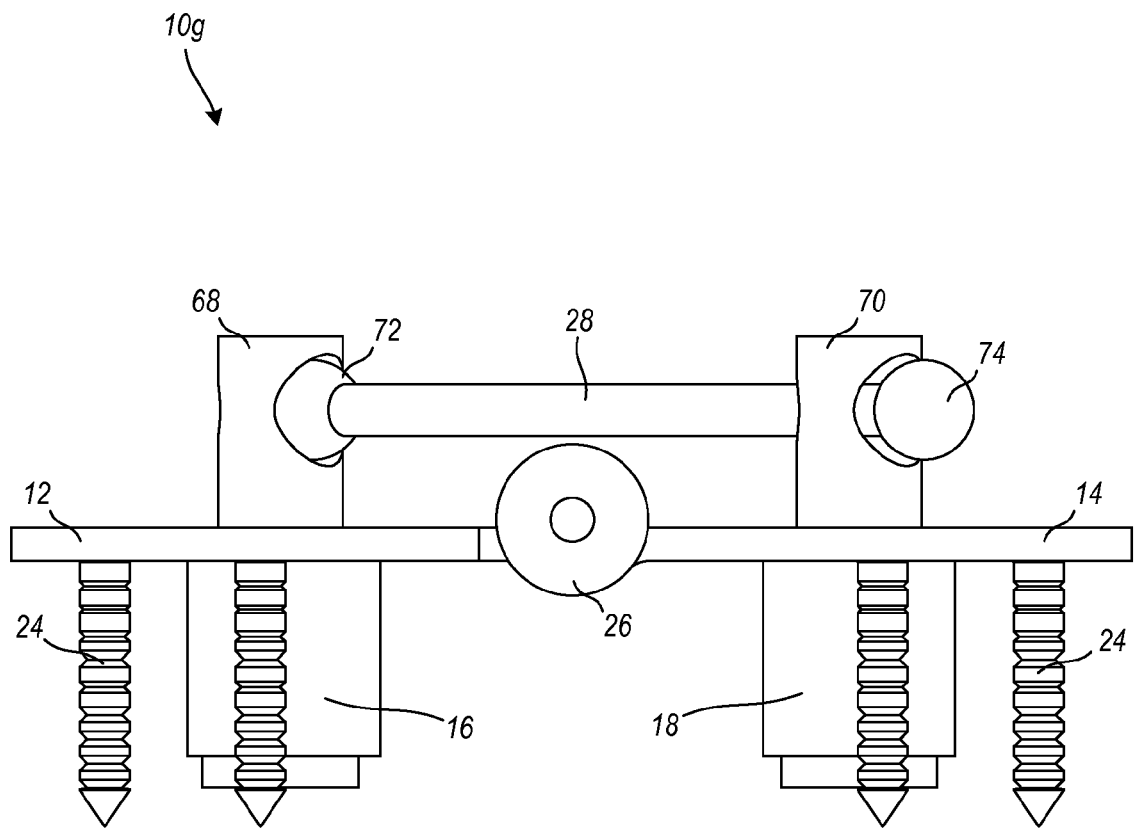
FIG. 27 is an end planar view of the hinge assembly shown in FIG. 25.
Figure 28:
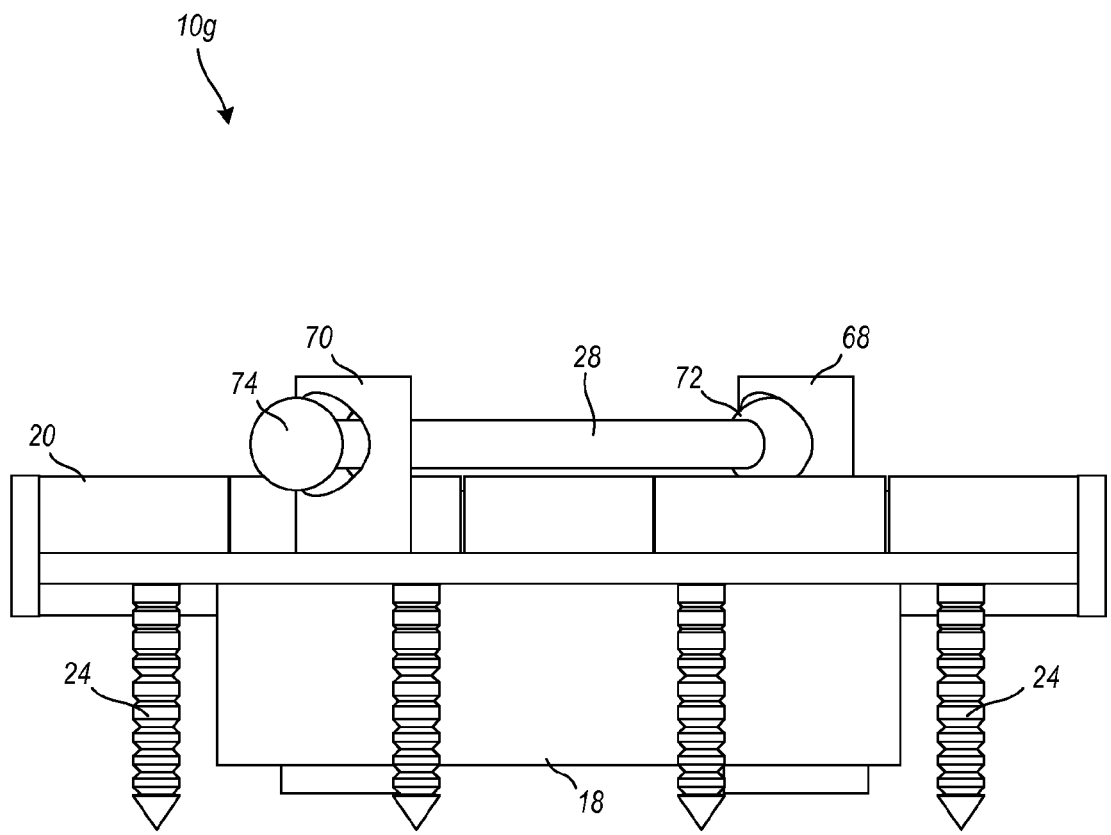
FIG. 28 is side planar view of the hinge assembly depicted in FIG. 25.
Figure 29:
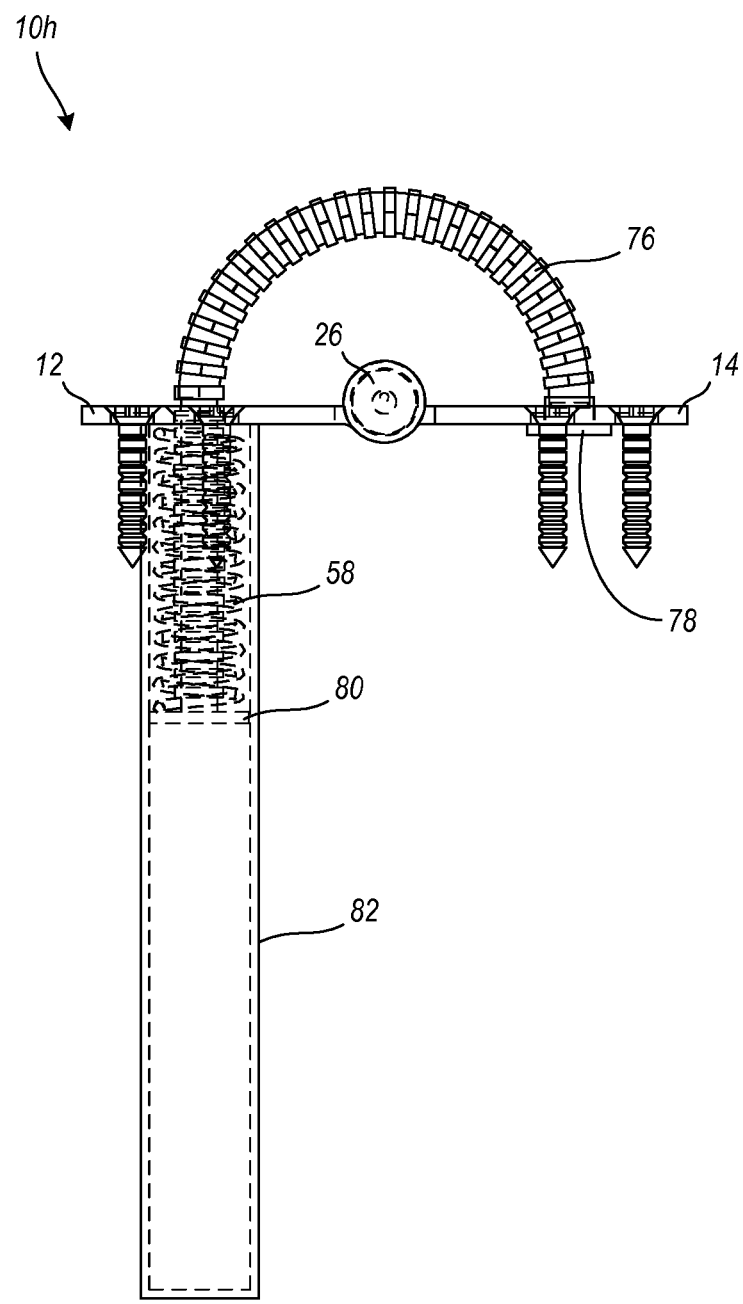
FIG. 29 is an end planar view of a hinge assembly, illustrating, in particular, a flexible conduit embodiment, and a mortar box on one hinge leaf side, according to an embodiment of the technology described herein.
Figure 30:
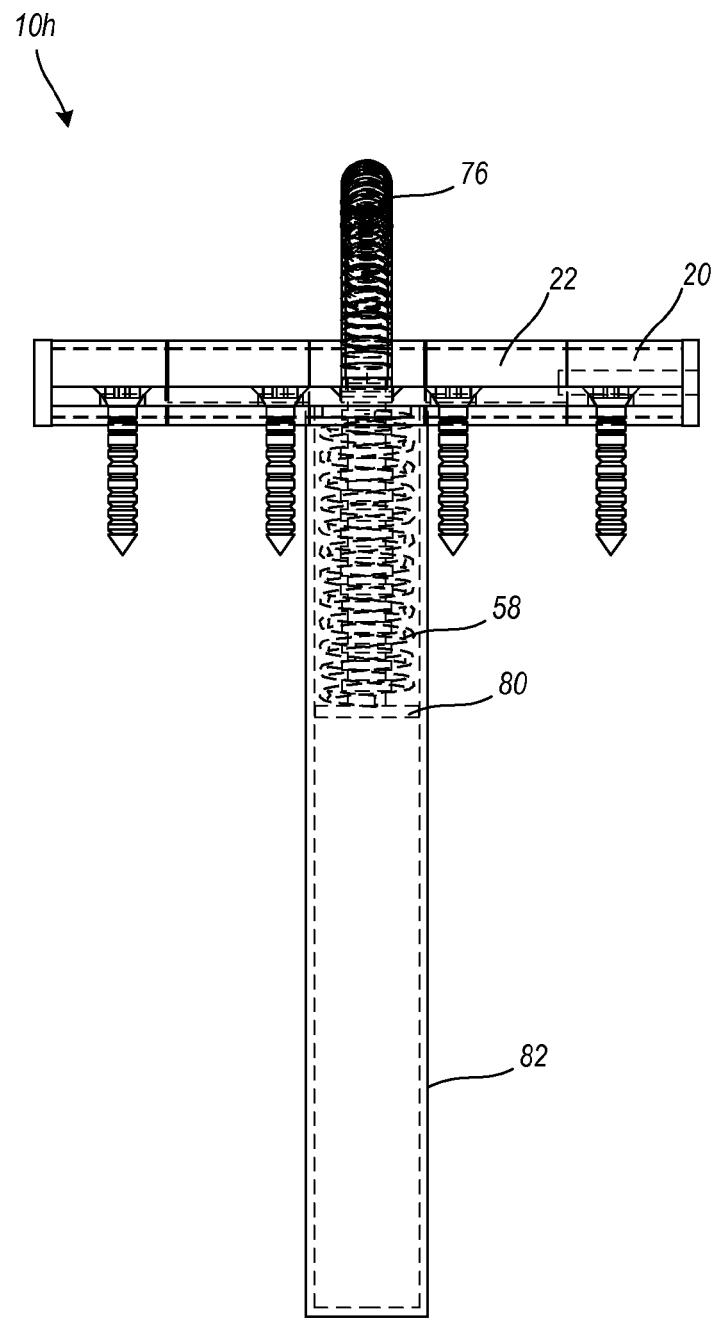
FIG. 30 is a side planar view of the hinge assembly shown in FIG. 29.
Figure 31:
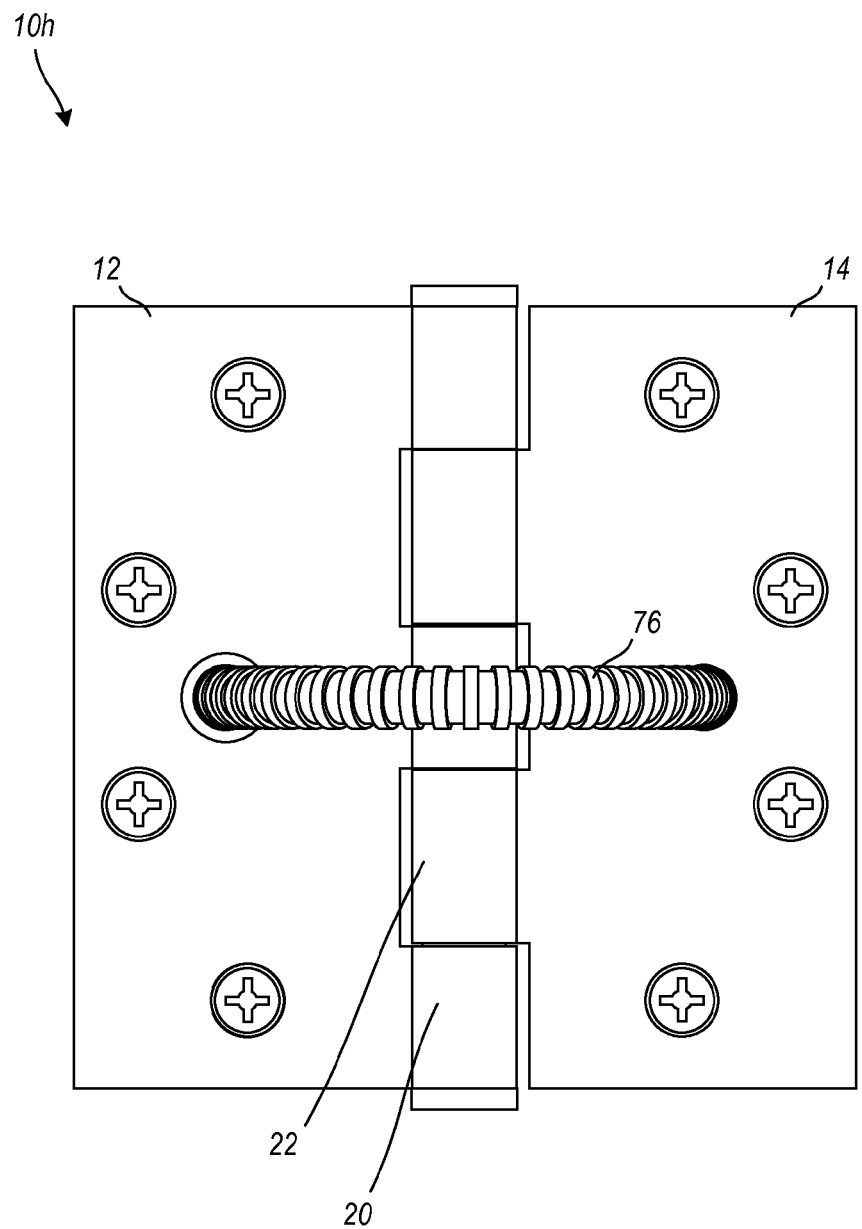
FIG. 31 is an front planar view of the hinge assembly shown in FIG. 29.
Figure 32:
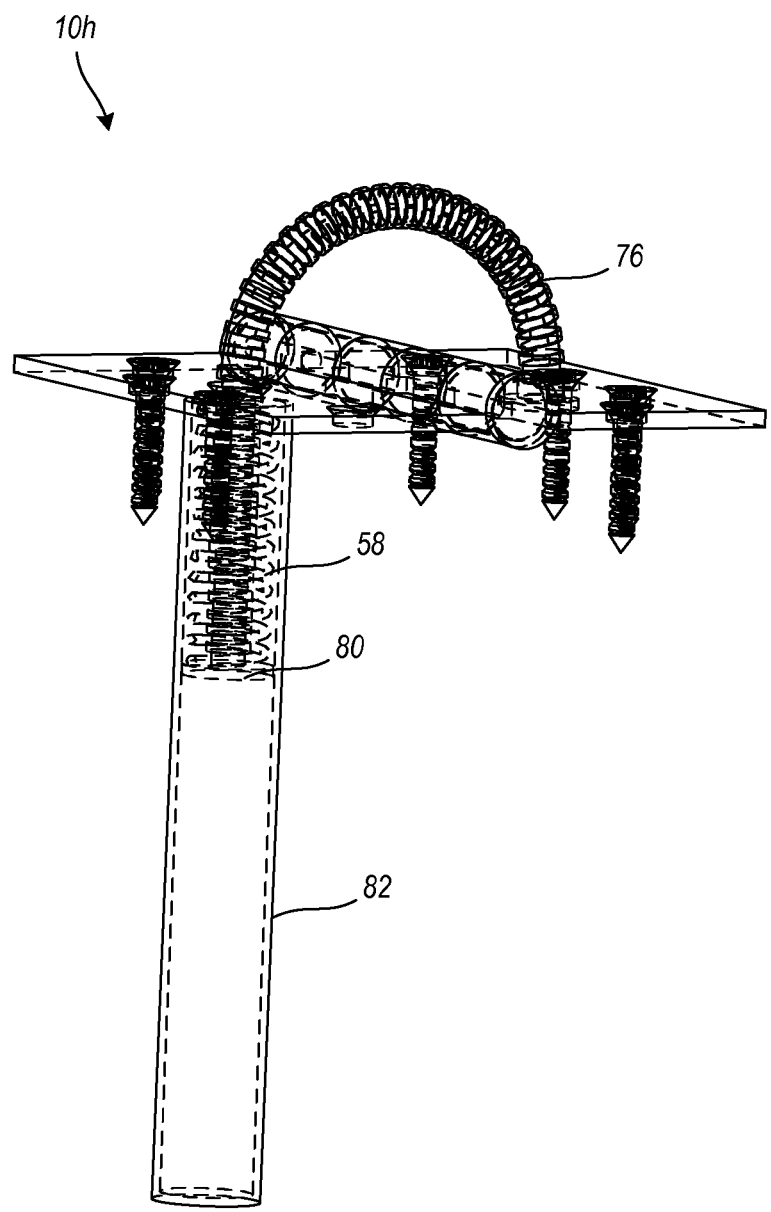
FIG. 32 is a perspective view of the hinge assembly depicted in FIG. 29.
Figure 33:
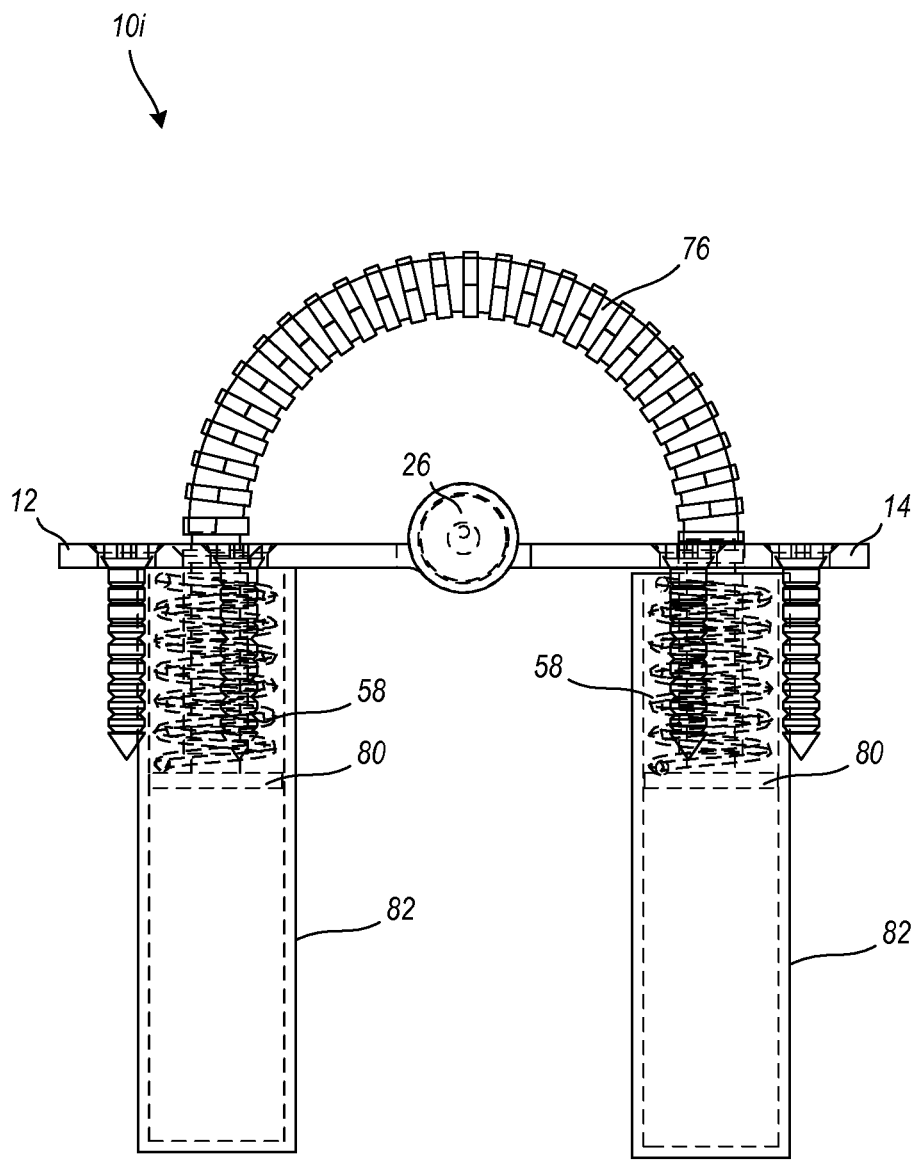
FIG. 33 is an end planar view of a hinge assembly, illustrating, in particular, a flexible conduit embodiment, shown with a mortar box on each hinge leaf, according to an embodiment of the technology described herein.
Figure 34:
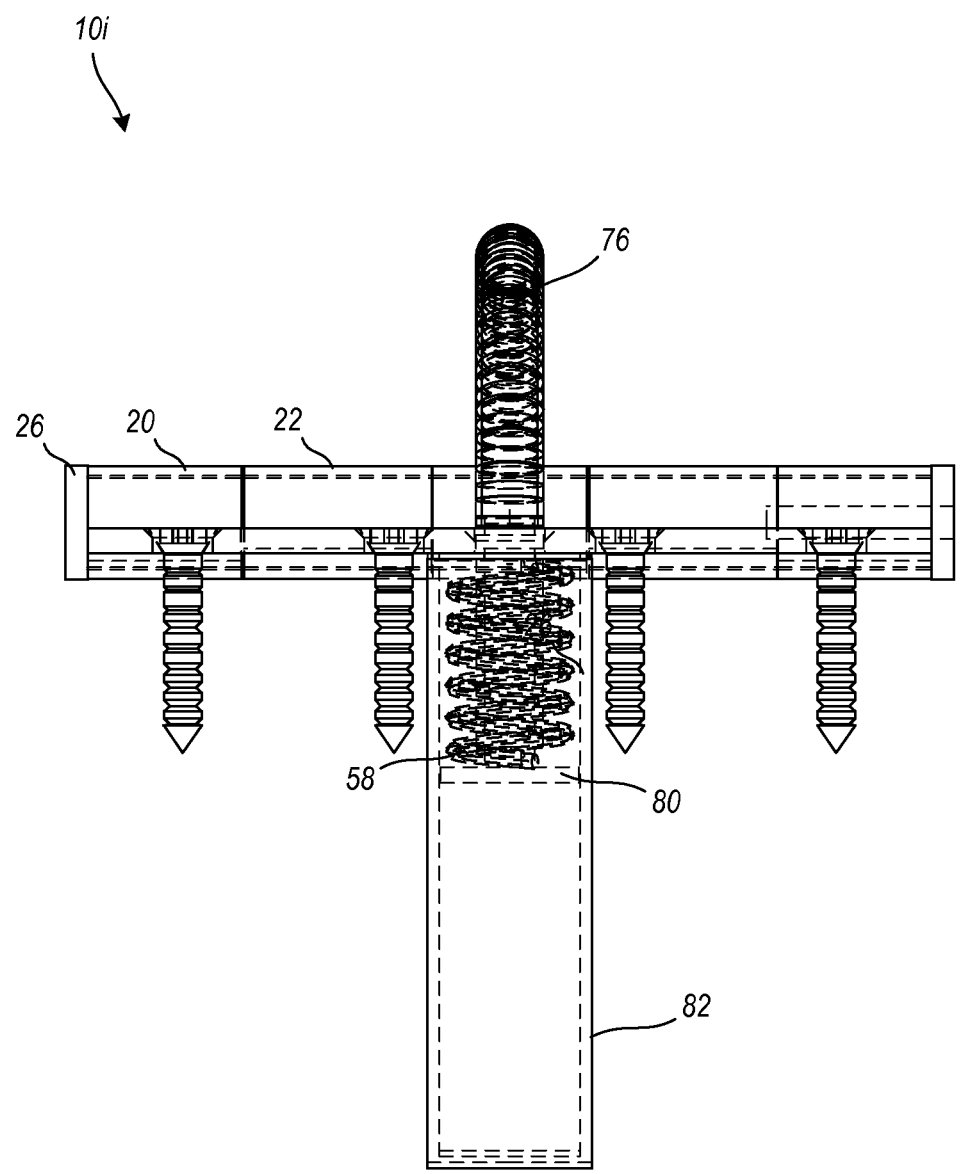
FIG. 34 is a side planar view of the hinge assembly shown in FIG. 33.
Figure 35:
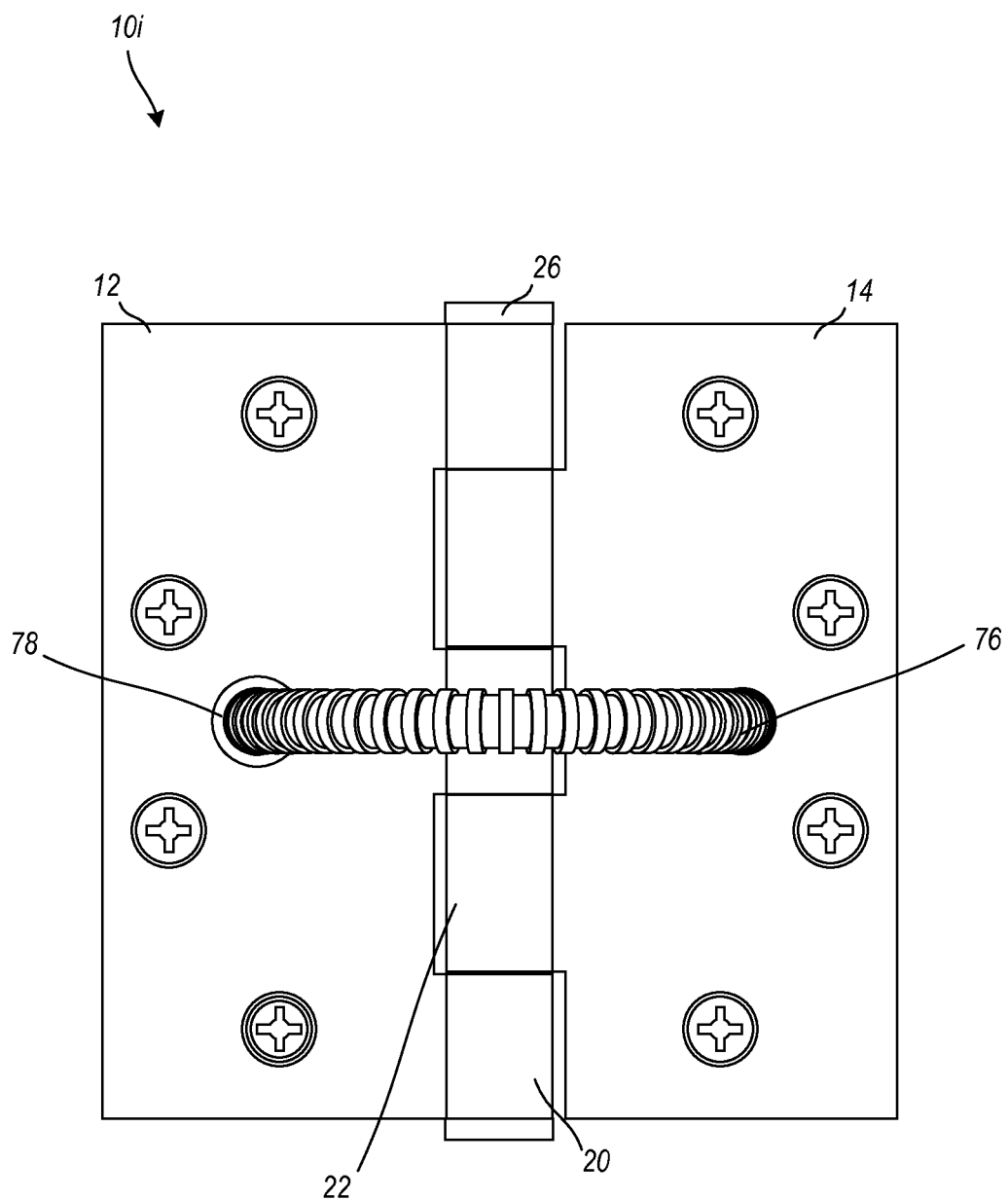
FIG. 35 is an front planar view of the hinge assembly depicted in FIG. 33.
Figure 36:
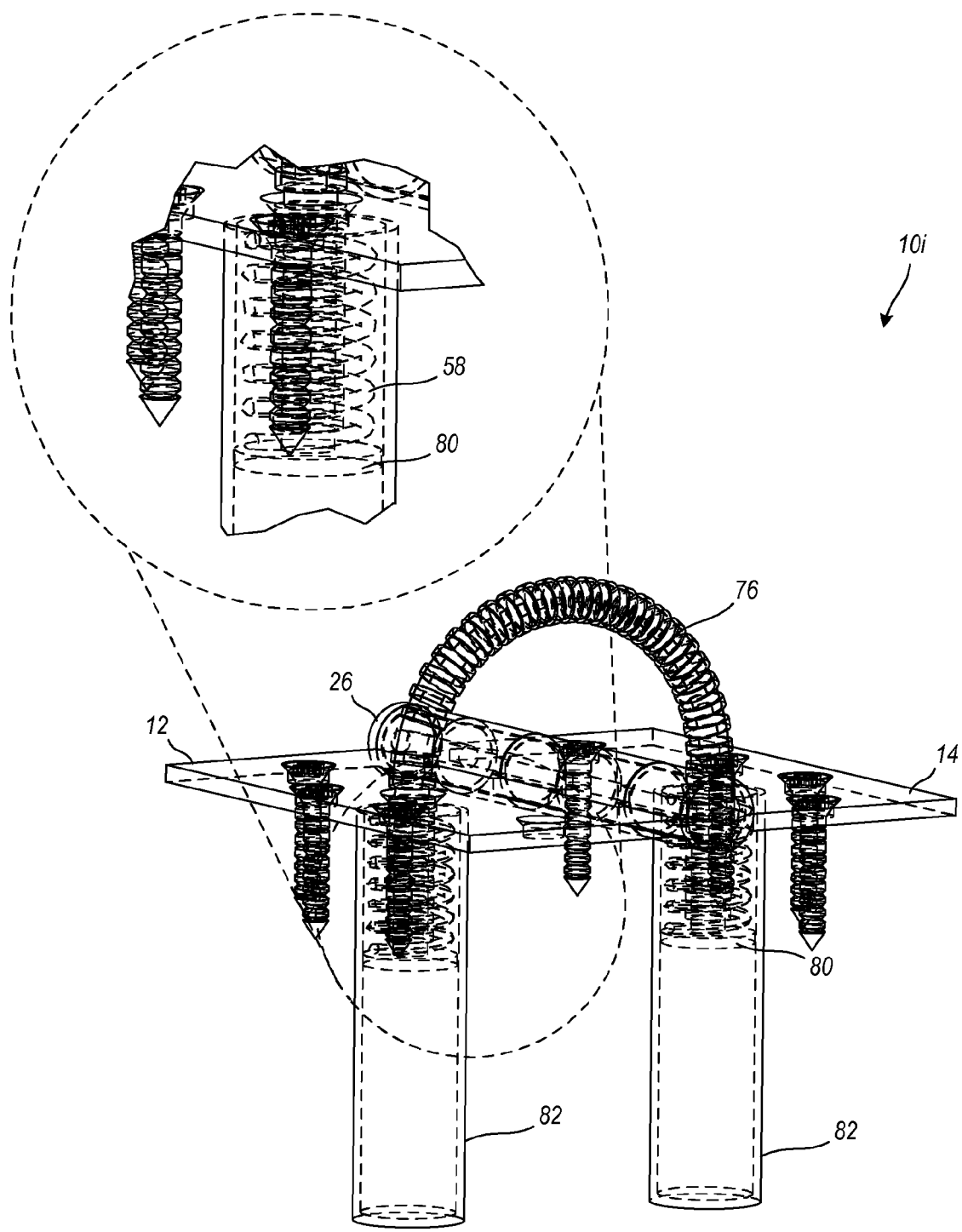
FIG. 36 is a perspective view of the hinge assembly depicted in FIG. 33.

Referring now to the Figures a hinge 10 is shown. In various embodiments (hinge 10a in FIGS. 1-4, hinge 10b in FIGS. 5-8, hinge 10c in FIGS. 9-12, hinge 10d in FIGS. 13-16, hinge 10e in FIGS. 17-20, hinge 10f in FIGS. 21-24, 10g in FIGS. 25-28, hinge 10h in FIGS. 29-32, and hinge 10i in FIGS. 33-36) the hinge 10 is configured to receive a conduit adapted to receive and pass through a medium of power transfer.

The hinge 10 includes a first hinge leaf 12 and a second hinge leaf 14. The second hinge leaf 14 is interleaved with the first hinge leaf 12 at a plurality of alternating knuckles such as 20, 22 and joined by barrel pin 26. One or more pins 26 can be utilized. Alternatively, the first hinge leaf 12 and the second hinge leaf 14 are joined by a gear assembly (not shown). In various embodiments, the hinge 10 is a hanging device, butt hinge, continuous or piano hinge, or pivot assembly having a first hinge leaf 12 and a second hinge leaf 14 that provide a means to receive a conduit adapted to receive and pass through a medium of power transfer.

Referring now to FIGS. 1 through 4, hinge 10a is depicted. The hinge 10a includes a housing defined within a posterior side of at least one of the first hinge leaf 12 and the second hinge leaf 14. The housing is configured to receive a conduit adapted to receive and pass through a medium of power transfer from the first hinge leaf 12 to the second hinge leaf 14 on an anterior side of the first hinge leaf 12 and second hinge leaf 14. As depicted the hinge 10a specifically includes a first housing 16 defined within a first posterior side of the first hinge leaf 12 and a second housing 18 defined within a second posterior side the second hinge leaf 14. Each of the first housing 16 and the second housing 18 are defined by an opening, or aperture defined on an anterior side of each first hinge leaf 12 and second hinge leaf 14, into which portions of the conduit, and any elements holding the conduit, are placed. By way of example, each of the first housing 16 and the second housing 18 also provide access to interior portions of a door and door frame.

In use, hinge 10a can be utilized to hold a door, or like device that is supported by and pivots on a hinged apparatus. In such an embodiment, first hinge leaf 12 is placed against a door frame, and second hinge leaf 14 is placed against a door. The first hinge leaf 12 and the second hinge leaf 14 can be secured to their respective contact points in the door and the door frame with screws 24, or like securing device. As will be apparent to one of ordinary skill in the art, upon reading this disclosure, various means can be utilized with which to secure the first hinge leaf 12 and the second hinge leaf 14 to a door, door frame, or the like.

As depicted hinge 10a includes a conduit having a portion of flexible conduit 30 and a portion of rigid conduit 28. In this embodiment, the flexible conduit 30 portions on each side of rigid conduit portion 28 provide for omni-directional movement of the conduit in and out of the housing 16 of the first hinge leaf 12 and out of the housing 18 of the second hinge leaf 14. The rigid conduit portion 28 provide strength and durability to the conduit, particularly at a point of contact where the first hinge leaf 12 and the second hinge leaf 14 are interleaved. In at least one embodiment, the conduit is rigid in the middle, with each terminating end harnessed to flexible metallic wire braided or metallic coil-spring tubing, composite material, or a combination of both.

As depicted hinge 10a includes a first turret assembly 32 in the housing 16 of the first hinge leaf 12. The hinge 10 includes a second turret assembly 34 in the housing 18 of the second hinge leaf 14. As depicted each turret assembly 32, 34 is a fixed assembly coupled to ball-and-socket connections.

The left shaft 40, having left ball 44 rotating within the left socket 36, couples the first turret assembly 32 to one end of the flexible conduit 30. The right shaft 42, having right ball 46 rotating within the right socket 38, couples the second turret assembly 34 to one end of the flexible conduit 30. The ball-and-socket connections provide for omni-directional movement of the conduit portions 28, 30.

By way of example, the first turret assembly 32 and the second turret assembly 34 can be harnessed to terminating ends of the conduit portion of the assembly. Alternatively, the first turret assembly 32 and the second turret assembly 34 each can share a male/female relationship with the terminating ends of the conduit portion of the assembly to allow for a moveable connection.

In use, and by way of example, hinge 10a can be pre-wired with 10-24 AWG, for embodiments wherein the power transfer medium is electrical and utilizes wiring. The hinge 10a can utilized coiled wire at the turret components to accommodate wire slack required in the opening and closing of assembly, with wires terminated into epoxy-sealed terminal blocks on back sides of turret components. In alternative embodiments, and instead of epoxy-sealed terminal blocks, the conductors penetrate the housing as leads.

Referring now to FIGS. 5 through 8, hinge 10b is depicted. In this embodiment, hinge 10b includes a flexible spring 30 without any combination with a rigid conduit 28, as in embodiment 10a. This conduit 30 provides significant flexibility and omni-directional movement.

Referring now to FIGS. 9 through 12, hinge 10c is depicted. In this embodiment, hinge 10c includes a hybrid conduit. The conduit includes a center rigid conduit 28 segment coupled to a specific flexible conduit that is one of braided wire and elastic conduit 48. This conduit combination with rigid conduit 28 coupled to braided wire/elastic conduit 48 provides significant flexibility and omni-directional movement.

Referring now to FIGS. 13 through 16, hinge 10d is depicted. The hinge 10d embodiment is generally similar that in the hinge 10c embodiment. However, no central rigid conduit 28 portion is utilized in hinge 10d. A braided wire/elastic conduit 48 is utilized between the first hinge leaf 12 and the second hinge leaf 14.

Referring now to FIGS. 17 through 20, hinge 10e is depicted. In this embodiment, the hinge 10e incorporates a telescopic conduit 56 between the first hinge leaf 12 and the second hinge leaf 14. The telescopic conduit 56 connects the first turret assembly to the second turret assembly through ball-and-socket connections. The hinge 10e also utilizes turret assemblies having spring-loaded turret fittings, such a right spring-loaded turret 54 and left spring-loaded turret 52. Each turret fitting is spring loaded with spring 58 to be recessed into a turret housing 50. As hinge 10e is opened to 180 degrees and the conduit contacts the hinge barrel, each ball-in-socket fitting projects out of its housing.

Referring now to FIGS. 21 through 24, hinge 10f is depicted. The hinge 10f utilizes a full rigid conduit 28 between the first hinge leaf 12 and the second hinge leaf 14. The rigid conduit 28 connects the first turret assembly to the second turret assembly through ball-and-socket connections. However, in this embodiment, each housing 16, 18 is further defined with track a track 64, 66 within which slide 60, 62 slide. In first hinge leaf 12 housing 16, slide 60 moves with track 64 to allow movement of turret 32. In second hinge leaf 14 housing 18, slide 62 moves within track 66 to allow movement of turret 34.

Referring now to FIGS. 25 through 28, hinge 10g is depicted. In this embodiment, hinge 10g utilizes reverse ball-and-socket connections to couple the conduit 28 to turret assemblies. The reverse ball-and-socket connections include right ball 72 rotating within right shaft 68 and left ball 74 rotating with left shaft 70.

Referring now to FIGS. 29 through 32, hinge 10h is depicted. The hinge 10h depicts a flexible conduit, such as flexible conduit, braided conduit, or flexible cable tray 76 utilized to connect between the first hinge leaf 12 and the second hinge leaf 14. Upper end cap 78 and lower end cap 80 can be utilized to prevent overextension of the flexible conduit 76 between the first hinge leaf and the second hinge leaf 14. The hinge 10h includes a mortar box 82 on one hinge leaf side, within which the flexible conduit 76 retracts. In various embodiments, hinge 10h can be adapted for opening at various degree ranges, such as to 180 degrees. In the various embodiments, the length of the flexible conduit 76 can vary. A seating spring 58 is utilized within the mortar box 82 to provide a tension and retract the flexible conduit 76 to a nested position. Additionally, the seating spring 58 provides structural security and safety by preventing the overextension, and potential crush if left overextended when a doors closes.

Referring now to FIGS. 33 through 36, hinge 10*i* is depicted. The hinge 10*i* depicts a flexible conduit, such as flexible conduit 76 utilized to connect between the first hinge leaf 12 and the second hinge leaf 14. However, in this embodiment, two housings or mortar boxes 82 are utilized as a sheath within which the flexible conduit 76 slides, extending and retracting. A seating spring 58 is utilized within the mortar box 82 to provide a tension and retract the flexible conduit 76 to a nested position. Additionally, the seating spring 58 provides structural security and safety by preventing the overextension, and potential crush if left overextended when a doors closes.

Figure 37:
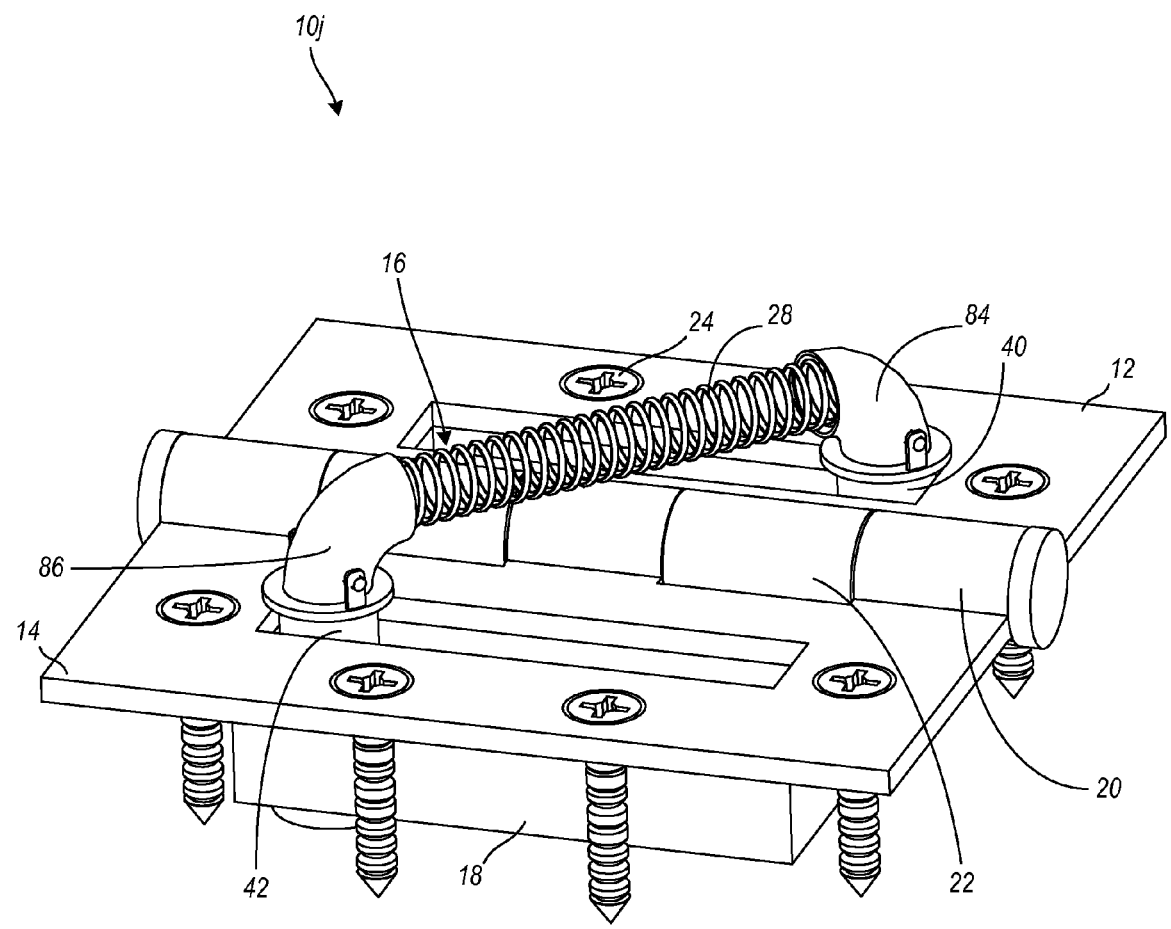
FIG. 37 is a front perspective view of a hinge assembly, illustrating, in particular, elbow connections to a flexible conduit, according to an embodiment of the technology described herein.
Figure 38:
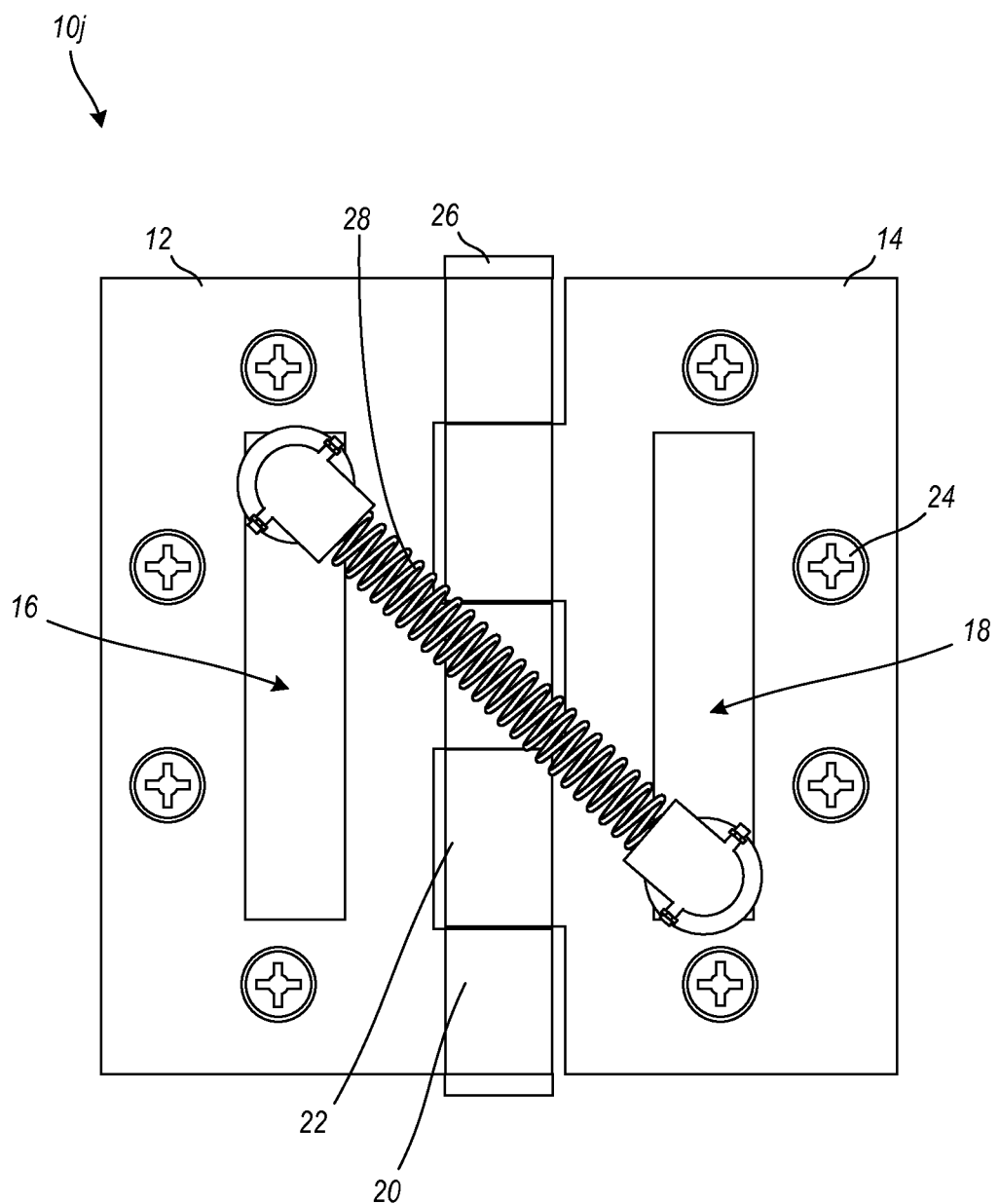
FIG. 38 is a front planar view of the hinge assembly shown in FIG. 37.
Figure 39:
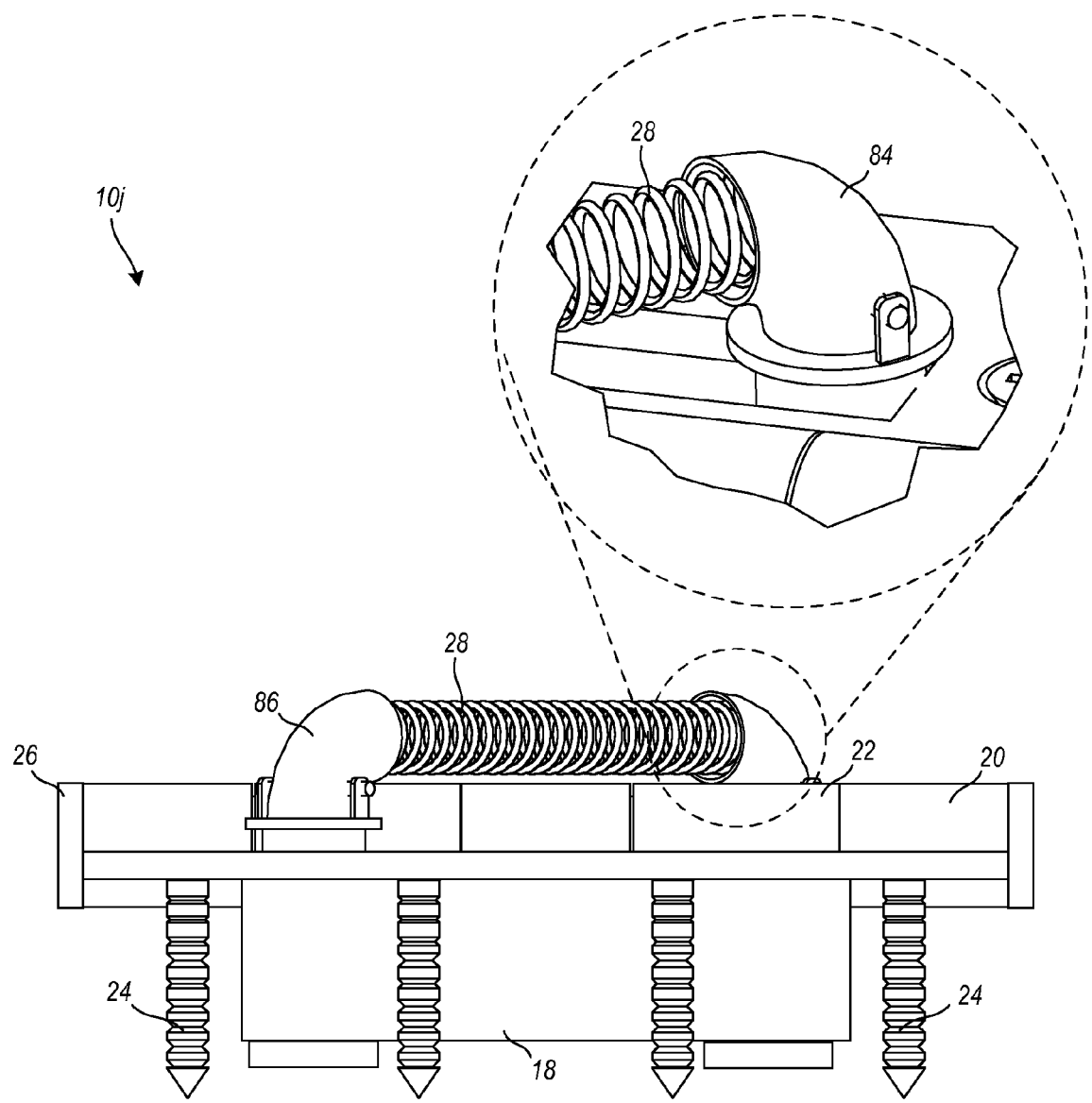
FIG. 39 is a side planar view of the hinge assembly shown in FIG. 37.
Figure 40:
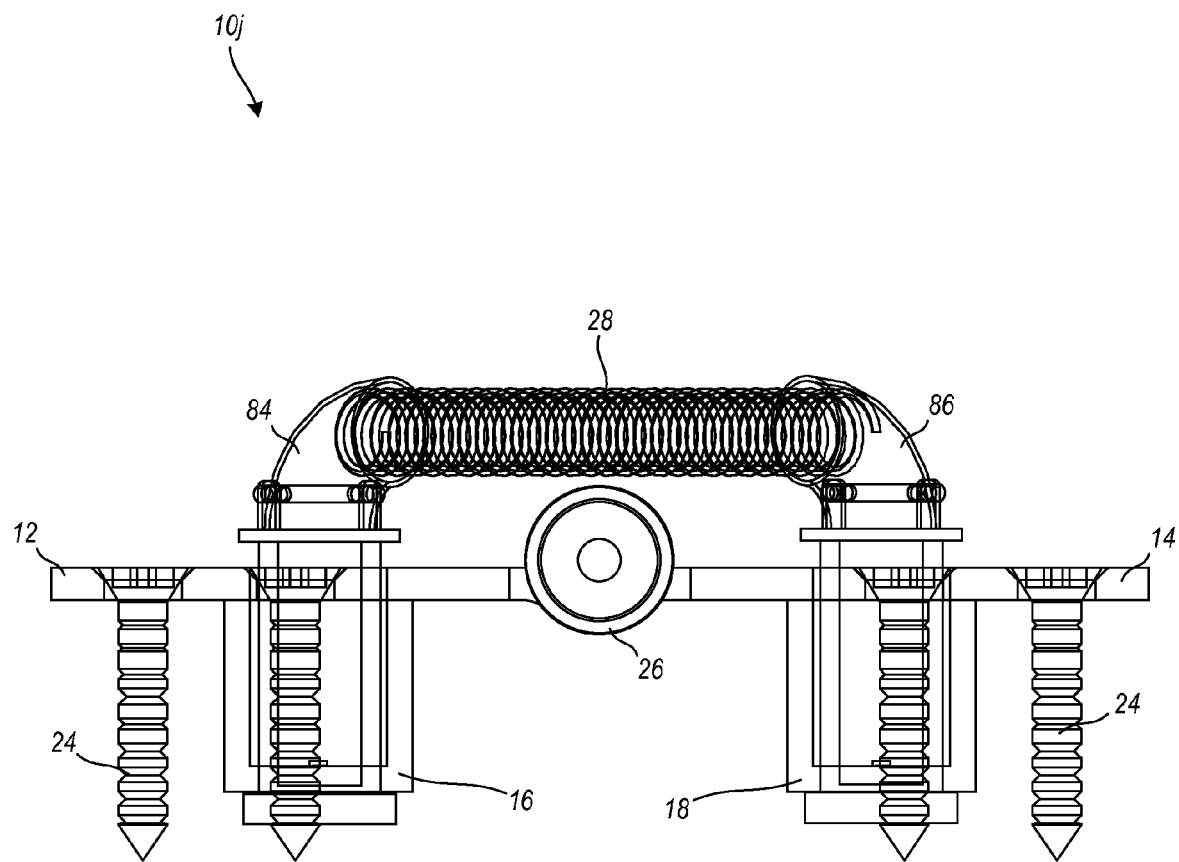
FIG. 40 is a end planar view of the hinge assembly shown in FIG. 37.

Referring now to FIGS. 37 through 40, hinge 10*j* is depicted. The hinge 10*j* depicts a flexible conduit 30 extendable between a left elbow 84 and a right elbow 86. Various conduits, such as rigid, flexible, telescoping, and hybrid rigid/flexible, can be utilized in this embodiment. The elbow joints 84, 86, also referred to as through pins, anchor the conduit to shaft 42, 40 within housings 16, 18.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A hinge comprising:
   a first hinge leaf;
   a second hinge leaf interleaved with the first hinge leaf;
   a housing defined within a posterior side of at least one of the first hinge leaf and the second hinge leaf and configured to receive a conduit adapted to receive and pass through a medium of power transfer from the first hinge leaf to the second hinge leaf on an anterior side of the first hinge leaf and second hinge leaf;
   an aperture defined on the anterior side of at least one of the first hinge leaf and the second hinge leaf through which to access the housing;
   a flexible conduit assembly connected between the first hinge leaf and the second hinge leaf, one end of the flexible conduit assembly being slidably disposed within the housing, wherein an open motion to the hinge extends the flexible conduit assembly from the housing, and wherein a close motion to the hinge retracts the flexible conduit assembly into the housing;
   an end cap disposed upon said one end of the flexible conduit assembly to prevent overextension; and
   a seating spring disposed around said one end of the conduit between said end cap and one of the first hinge leaf and the second leaf, to provide a tension and retract the conduit to a nested position and to provide structural security and safety by preventing the overextension, and potential crush of the flexible conduit if left overextended when a doors closes.

2. A hinge assembly comprising:
   a hinge having a first hinge leaf and a second hinge leaf interleaved with the first hinge leaf;
   a housing defined within a posterior side of at least one of the first hinge leaf and the second hinge leaf and configured to receive the conduit, wherein the conduit is adapted to receive and pass through a medium of power transfer from the first hinge leaf to the second hinge leaf on an anterior side of the first hinge leaf and the second hinge leaf, and wherein the conduit extends outwardly from the housing as the hinge is opened and retracts inwardly into the housing as the hinge is closed; and
   an aperture defined on the anterior side of at least one of the first hinge leaf and the second hinge leaf through which to access the housing;
   a conduit assembly connected between the first hinge leaf and the second hinge leaf, one end of the conduit assembly being slidably disposed within the housing, wherein an open motion to the hinge extends the conduit assembly from the housing, and wherein a close motion to the hinge retracts the conduit assembly into the housing;
   an end cap disposed upon said one end of the conduit assembly to prevent overextension; and
   a seating spring disposed around said one end of the conduit between said end cap and one of the first hinge leaf and the second leaf, to provide a tension and retract the conduit to a nested position and to provide structural security and safety by preventing the overextension, and potential crush of the conduit if left overextended when a doors closes.

3. The hinge assembly of claim 2, wherein the conduit comprises a flexible conduit.

4. The hinge assembly of claim 2, wherein the conduit comprises a rigid conduit.

5. The hinge assembly of claim 2, wherein the conduit comprises a rigid telescoping conduit.

6. The hinge assembly of claim 2, wherein the conduit comprises a braided wire elastic conduit.

7. The hinge assembly of claim 2, wherein the conduit comprises a conduit comprised of at least one rigid portion and at least one flexible portion, and wherein the rigid portion and the flexible portion are coupled one to another.

8. A door assembly comprising:
   a door;
   at least one power transfer hinge, disposed upon the door to provide a means by which the door is hung, opened, and closed, and through which the conduit passes on an anterior side of the hinge, the hinge comprising a first hinge leaf and a second hinge leaf interleaved with the first hinge leaf;
   a housing defined within a posterior side of at least one of the first hinge leaf and the second hinge leaf and configured to receive a conduit, wherein the conduit is adapted to receive and pass through a medium of power transfer from the first hinge leaf to the second hinge leaf on an anterior side of the first hinge leaf and the second hinge leaf, and wherein the conduit extends outwardly from the housing as the hinge is opened and retracts inwardly into the housing as the hinge is closed; and
   an aperture defined on the anterior side of at least one of the first hinge leaf and the second hinge leaf through which to access the housing;
   a flexible conduit assembly connected between the first hinge leaf and the second hinge leaf, one end of the flexible conduit assembly being slidably disposed within the housing, wherein an open motion to the hinge extends the flexible conduit assembly from the housing, and wherein a close motion to the hinge retracts the flexible conduit assembly into the housing;
   an end cap disposed upon said one end of the flexible conduit assembly to prevent overextension;
   a seating spring disposed around said one end between said end cap and one of the first hinge leaf and the second leaf, to provide a tension and retract the conduit to a nested position and to provide structural security and safety by preventing the overextension, and potential crush of the flexible conduit if left overextended when a doors closes.

* * * * *